US011797687B2

(12) United States Patent
Sasaki et al.

(10) Patent No.: US 11,797,687 B2
(45) Date of Patent: *Oct. 24, 2023

(54) INFORMATION PROCESSING DEVICE, INFORMATION PROCESSING METHOD, AND RECORDING MEDIUM

(71) Applicant: Panasonic Intellectual Property Corporation of America, Torrance, CA (US)

(72) Inventors: Takamitsu Sasaki, Osaka (JP); Ryota Takahashi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 17/225,495

(22) Filed: Apr. 8, 2021

(65) Prior Publication Data

US 2021/0240838 A1 Aug. 5, 2021

Related U.S. Application Data

(63) Continuation of application No. PCT/JP2019/032336, filed on Aug. 20, 2019.
(Continued)

(30) Foreign Application Priority Data

May 27, 2019 (JP) .................................. 2019-098771

(51) Int. Cl.
*G06F 21/57* (2013.01)
*B60R 25/01* (2013.01)
(Continued)

(52) U.S. Cl.
CPC ............ *G06F 21/577* (2013.01); *B60R 25/01* (2013.01); *B60R 25/102* (2013.01);
(Continued)

(58) Field of Classification Search
CPC ................ G06F 21/577; G06F 21/629; G06F 2221/033; G06F 21/552; B60R 25/01;
(Continued)

(56) References Cited

U.S. PATENT DOCUMENTS

2005/0195071 A1* 9/2005 Ewerhart ............. B62D 15/027
340/932.2
2015/0358351 A1 12/2015 Otsuka et al.
(Continued)

FOREIGN PATENT DOCUMENTS

EP 2 892 199 7/2015
JP 2014-146868 8/2014
(Continued)

OTHER PUBLICATIONS

International Search Report (ISR) dated Oct. 1, 2019 in International (PCT) Application No. PCT/JP2019/032336.
(Continued)

*Primary Examiner* — Meng Li
(74) *Attorney, Agent, or Firm* — Wenderoth, Lind & Ponack, L.L.P.

(57) ABSTRACT

An information processing device comprising: a processor; and a memory including at least one set of instructions that, when executed by the processor, causes the processor to perform operations. The operations include: obtaining incident information about an incident of a cyberattack that occurred in a vehicle; obtaining second vehicle information about a state of a second vehicle via communication with the second vehicle; determining a risk level of a vehicle function of the second vehicle based on a degree of matching between
(Continued)

the incident information and the second vehicle information; generating a function restriction command for restricting a vehicle function of a first vehicle corresponding to the vehicle function of the second vehicle, when the risk level is higher than a first criterion, the vehicle function of the first vehicle being one among one or more vehicle functions of the first vehicle; and outputting the function restriction command.

11 Claims, 35 Drawing Sheets

Related U.S. Application Data

(60) Provisional application No. 62/746,851, filed on Oct. 17, 2018.

(51) Int. Cl.
    *B60R 25/102*     (2013.01)
    *G06F 21/62*     (2013.01)
    *G08G 1/052*     (2006.01)

(52) U.S. Cl.
    CPC ........... *G06F 21/629* (2013.01); *G08G 1/052* (2013.01); *G06F 2221/033* (2013.01)

(58) Field of Classification Search
    CPC .... B60R 25/102; G08G 1/052; G08G 1/0112; G08G 1/0141; G08G 1/0133; G08G 1/096725; H04L 2209/84; H04L 63/1441; H04L 67/12
    See application file for complete search history.

(56) References Cited

U.S. PATENT DOCUMENTS

| | | | | |
|---|---|---|---|---|
| 2018/0295147 A1* | 10/2018 | Haga | ........................ | H04L 12/40 |
| 2019/0384289 A1* | 12/2019 | Yeung | ................... | G05D 1/0285 |
| 2021/0044612 A1* | 2/2021 | Kawauchi | ......... | B60W 50/0225 |
| 2021/0258339 A1* | 8/2021 | Dyakin | ............... | H04W 12/122 |
| 2021/0293572 A1* | 9/2021 | Konrardy | ................ | G06F 21/32 |

FOREIGN PATENT DOCUMENTS

| | | |
|---|---|---|
| JP | 2017-111796 | 6/2017 |
| WO | 2017/175160 | 10/2017 |

OTHER PUBLICATIONS

Extended European Search Report dated Oct. 29, 2021 in corresponding European Patent Application No. 19873367.7.

* cited by examiner

FIG. 2

| INCIDENT ID | DATE AND TIME OF OCCURRENCE | AREA OF OCCURRENCE | VEHICLE TYPE | RISK COMPONENT | RISK FUNCTION | INTRUSION ROUTE | THREAT LEVEL |
|---|---|---|---|---|---|---|---|
| cs-A01 | 2020/12/04 | XX WARD, TOKYO | X | ECU-a | IPA | IVI, CAN | MEDIUM |
| cs-B01 | 2020/11/04 | YY CITY, OSAKA | X | ECU-b | WI-FI CONNECTION | IVI | LOW |
| ... | ... | ... | ... | ... | ... | ... | ... |
| cs-C01 | 2019/04/03 | ZZ CITY, OKINAWA | Y | IVI-a | AUTOMATED DRIVING | CAN, Ethernet | HIGH |
| ... | ... | ... | ... | ... | ... | ... | ... |
| cs-D01 | 2018/03/03 | AX CITY, HOKKAIDO | Z | IVI-b | BLUETOOTH CONNECTION | Bluetooth | LOW |
| ... | ... | ... | ... | ... | ... | ... | ... |

FIG. 7A

| MODEL NUMBER | SOFTWARE VERSION | RISK POINT |
|---|---|---|
| ECU-a | 1.0.1 | 5 |
| | 1.0.2 | 2 |
| | 1.0.3 | 1 |
| ECU-b | 1.0 | 1 |
| ⋮ | ⋮ | ⋮ |
| IVI-a | 1.0 | 1 |
| | 1.1 | 5 |
| | 1.2 | 4 |
| | 1.3 | 3 |
| IVI-b | 1.0.0 | 10 |
| | 2.0.0 | 2 |
| ⋮ | ⋮ | ⋮ |

FIG. 7B

| MANUFACTURER | RISK POINT |
|---|---|
| COMPANY A | 1 |
| COMPANY B | 2 |
| COMPANY C | 1 |
| COMPANY D | 5 |
| ⋮ | ⋮ |

FIG. 7C

| AREA | RISK POINT |
|---|---|
| XX WARD, TOKYO | 2 |
| YY CITY, OSAKA | 4 |
| YX CITY, KANAGAWA | 8 |
| ZY CITY, AICHI | 10 |
| ⋮ | ⋮ |

FIG. 7D

| VEHICLE TYPE | RISK POINT |
|---|---|
| X | 1 |
| Y | 2 |
| Z | 1 |
| A | 14 |
| ⋮ | ⋮ |

FIG. 7E

| INTRUSION ROUTE | RISK POINT |
|---|---|
| CAN | 8 |
| Ethernet | 5 |
| FlexRay | 1 |
| MOST | 2 |
| TCP/IP | 2 |
| HTTP | 2 |
| ⋮ | ⋮ |

FIG. 7F

| FUNCTION NAME | RISK POINT |
|---|---|
| AUTOMATED DRIVING | 20 |
| DRIVING SUPPORT | 5 |
| WI-FI CONNECTION | 10 |
| BLUETOOTH CONNECTION | 5 |
| TRAVELING CONTROL | 40 |
| LTE COMMUNICATION | 5 |
| OTA FUNCTION | 20 |
| ⋮ | ⋮ |

FIG. 7G

| FUNCTION NAME | TRAVELING STATE | RISK POINT |
|---|---|---|
| AUTOMATED DRIVING | HIGH SPEED TRAVELING | 15 |
| | LOW SPEED TRAVELING | 5 |
| | STOP | 3 |
| DRIVING SUPPORT | HIGH SPEED TRAVELING | 10 |
| | LOW SPEED TRAVELING | 5 |
| | STOP | 1 |
| WI-FI CONNECTION | HIGH SPEED TRAVELING | 5 |
| | LOW SPEED TRAVELING | 5 |
| | STOP | 0 |
| BLUETOOTH CONNECTION | HIGH SPEED TRAVELING | 5 |
| | LOW SPEED TRAVELING | 5 |
| | STOP | 0 |
| TRAVELING CONTROL | HIGH SPEED TRAVELING | 20 |
| | LOW SPEED TRAVELING | 10 |
| | STOP | 0 |
| LTE COMMUNICATION | HIGH SPEED TRAVELING | 5 |
| | LOW SPEED TRAVELING | 5 |
| | STOP | 0 |
| OTA FUNCTION | HIGH SPEED TRAVELING | 5 |
| | LOW SPEED TRAVELING | 5 |
| | STOP | 0 |
| ⋮ | ⋮ | ⋮ |

FIG. 10

| VEHICLE ID : 10000A 2020/12/05 | | | |
|---|---|---|---|
| MODEL NUMBER | MANUFACTURER | SOFTWARE VERSION | RELATED FUNCTION |
| ECU-a | COMPANY A | 1.0.2 | AUTOMATED DRIVING |
| ECU-b | COMPANY A | 3.0.3 | DRIVING SUPPORT, AUTOMATED DRIVING |
| ECU-c | COMPANY B | 2.0.1 | SPEED CONTROL |
| ... | ... | ... | ... |
| IVI-a | COMPANY B | 1.0.0 | LTE COMMUNICATION, WI-FI COMMUNICATION |
| IVI-b | COMPANY C | 3.1.0 | OTA |
| ... | ... | ... | ... |

FIG. 11

| VEHICLE ID | DATE AND TIME | TRAVELING POSITION | VEHICLE TYPE | COMMUNICATION PROTOCOL | INSTALLED FUNCTION | TRAVELING STATE |
|---|---|---|---|---|---|---|
| 10000A | 2020/10/12 08:00:30 | XX WARD, TOKYO | X | CAN, FLEXRAY, MOST | DRIVING SUPPORT, AUTOMATED DRIVING, Wi-Fi | AUTOMATED DRIVING/STOP |

FIG. 12

| FUNCTION NAME | TYPE | RESTRICTION | INVALIDATION | RISK SCORE |
|---|---|---|---|---|
| AUTOMATED DRIVING | TRAVELING | STOP SPECIFIC AUTOMATED DRIVING FUNCTION | INVALIDATE AUTOMATED DRIVING FUNCTION | 203 |
| DRIVING SUPPORT | TRAVELING | STOP SPECIFIC DRIVING SUPPORT FUNCTION | INVALIDATE DRIVING SUPPORT FUNCTION | 53 |
| WI-FI CONNECTION | COMMUNICATION | PROHIBIT WI-FI CONNECTION DURING DRIVING | INVALIDATE WI-FI CONNECTION FUNCTION | 67 |
| BLUETOOTH CONNECTION | COMMUNICATION | PROHIBIT BLUETOOTH CONNECTION DURING DRIVING | INVALIDATE BLUETOOTH CONNECTION FUNCTION | 29 |
| TRAVELING CONTROL | TRAVELING | SET UPPER SPEED LIMIT TO 80 KM/H, INCREASE MINIMUM INTER-VEHICULAR DISTANCE | INVALIDATE TRAVELING FUNCTION | 0 |
| LTE COMMUNICATION | COMMUNICATION | RESTRICT BANDWIDTH FOR LTE COMMUNICATION | INVALIDATE LTE COMMUNICATION FUNCTION | 10 |
| OTA FUNCTION | COMMUNICATION | RESTRICT BANDWIDTH FOR OTA EXECUTION | INVALIDATE OTA FUNCTION | 0 |
| ... | ... | ... | ... | ... |

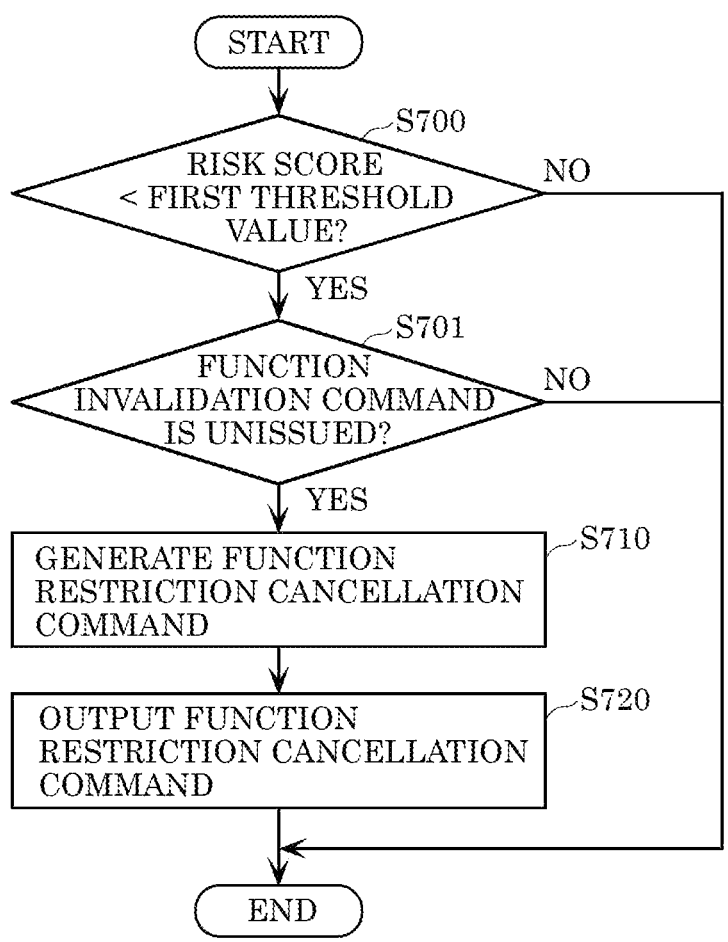

INFORMATION PROCESSING DEVICE, INFORMATION PROCESSING METHOD, AND RECORDING MEDIUM

CROSS REFERENCE TO RELATED APPLICATIONS

This application is a U.S. continuation application of PCT International Patent Application Number PCT/JP2019/032336 filed on Aug. 20, 2019, claiming the benefit of priority of U.S. Provisional Patent Application No. 62/746,851 filed on Oct. 17, 2018 and Japanese Patent Application Number 2019-098771 filed on May 27, 2019, the entire contents of which are hereby incorporated by reference.

BACKGROUND

1. Technical Field

The present disclosure relates to an information processing device that processes information used in a vehicle.

2. Description of the Related Art

In automobiles which are becoming more high-tech, much information is exchanged within the in-vehicle network system, and between the in-vehicle network and external information devices, traffic infrastructure, or systems such as other vehicles. The threat of cyberattack which exploits the vulnerability of the in-vehicle network system which processes exchanged information has become apparent.

A technique for improving the security of a high-tech automobile achieved through information processing has been proposed (see Japanese Unexamined Patent Application Publication No. 2014-146868 (Patent Literature (PTL) 1), for example).

SUMMARY

However, the countermeasures disclosed in PTL 1 are to detect and address an attack which has occurred due to the transmission of an anomalous message or the like after the attacker has already made an intrusion to the in-vehicle network. In other words, the vehicle is affected by the attack until the problem has been completely addressed. In addition, when a vehicle is attacked by a pattern unknown to the vehicle which is the target of the attack, detecting or stopping the anomaly may take time, and the damage may become serious.

The present disclosure provides an information processing device and the like which prevents intrusion into an in-vehicle network to prevent cyberattacks from occurring and the damage from becoming serious even when the attack is made by a method unknown to the vehicle itself.

An information processing device according to one aspect of the present disclosure is an information processing device that processes information about a first vehicle and information about a second vehicle, the information processing device comprising: a processor; and a memory including at least one set of instructions that, when executed by the processor, causes the processor to perform operations. The operations include: obtaining incident information about an incident of a cyberattack that occurred in a vehicle; obtaining second vehicle information about a state of the second vehicle via communication with the second vehicle; storing, in the memory, the incident information and the second vehicle information; determining a risk level of a vehicle function of the second vehicle based on a degree of matching between the incident information and the second vehicle information; generating a function restriction command for restricting a vehicle function of the first vehicle corresponding to the vehicle function of the second vehicle, when the risk level is higher than a first criterion, the vehicle function of the first vehicle being one among one or more vehicle functions of the first vehicle; and outputting the function restriction command.

An information processing method according to one aspect of the present disclosure is an information processing method performed by a processor included in an information processing device that processes information about a first vehicle and information about a second vehicle. The information processing method includes: obtaining incident information about an incident of a cyberattack that occurred in a vehicle; obtaining second vehicle information about a state of the second vehicle via communication with the second vehicle; determining a risk level of a vehicle function of the second vehicle based on a degree of matching between the incident information and the second vehicle information; and generating and outputting a function restriction command for restricting a vehicle function of the first vehicle corresponding to the vehicle function of the second vehicle, when the risk level is higher than a first criterion.

A recording medium according to one aspect of the present disclosure is a non-transitory computer-readable recording medium having a program for use in an information processing device that includes a processor and a memory, the information processing device processing information about a first vehicle and information about a second vehicle, the program, when executed by the processor using the memory, causing the processor to execute: obtaining incident information about an incident of a cyberattack that occurred in a vehicle; obtaining second vehicle information about a state of the second vehicle via communication with the second vehicle; determining a risk level of a vehicle function of the second vehicle based on a degree of matching between the incident information and the second vehicle information; and generating and outputting a function restriction command for restricting a vehicle function of the first vehicle corresponding to the vehicle function of the second vehicle, when the risk level is higher than a first criterion.

General and specific aspects disclosed above may be implemented using a system, an integrated circuit, or a computer-readable recording medium such as a CD-ROM, or any combination of devices, systems, methods, integrated circuits, computer programs, or recording media.

The present disclosure provides an information processing device and the like which prevents intrusion into an in-vehicle network to prevent cyberattacks from occurring and the damage from becoming serious even when the attack is made by a method unknown to the vehicle itself.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 illustrates an example of a data structure of incident information in Embodiment 1;

FIG. 7A is an example of a risk point table used in the security risk countermeasure process;

FIG. 7B is an example of a risk point table used in the security risk countermeasure process;

FIG. 7C is an example of a risk point table used in the security risk countermeasure process;

FIG. 7D is an example of a risk point table used in the security risk countermeasure process;

FIG. 7E is an example of a risk point table used in the security risk countermeasure process;

FIG. 7F is an example of a risk point table used in the security risk countermeasure process;

FIG. 7G is an example of a risk point table used in the above security risk countermeasure process;

FIG. 10 illustrates an example of a data structure of vehicle information in Embodiment 1;

FIG. 11 illustrates an example of a data structure of the vehicle information in Embodiment 1;

FIG. 12 illustrates an example of a data structure of a risk level management list in Embodiment 1;

FIG. 17 is a flowchart illustrating an example of steps for a risk control process using the risk score included in the risk level management list;

DETAILED DESCRIPTION OF THE EMBODIMENTS

Figure 1:
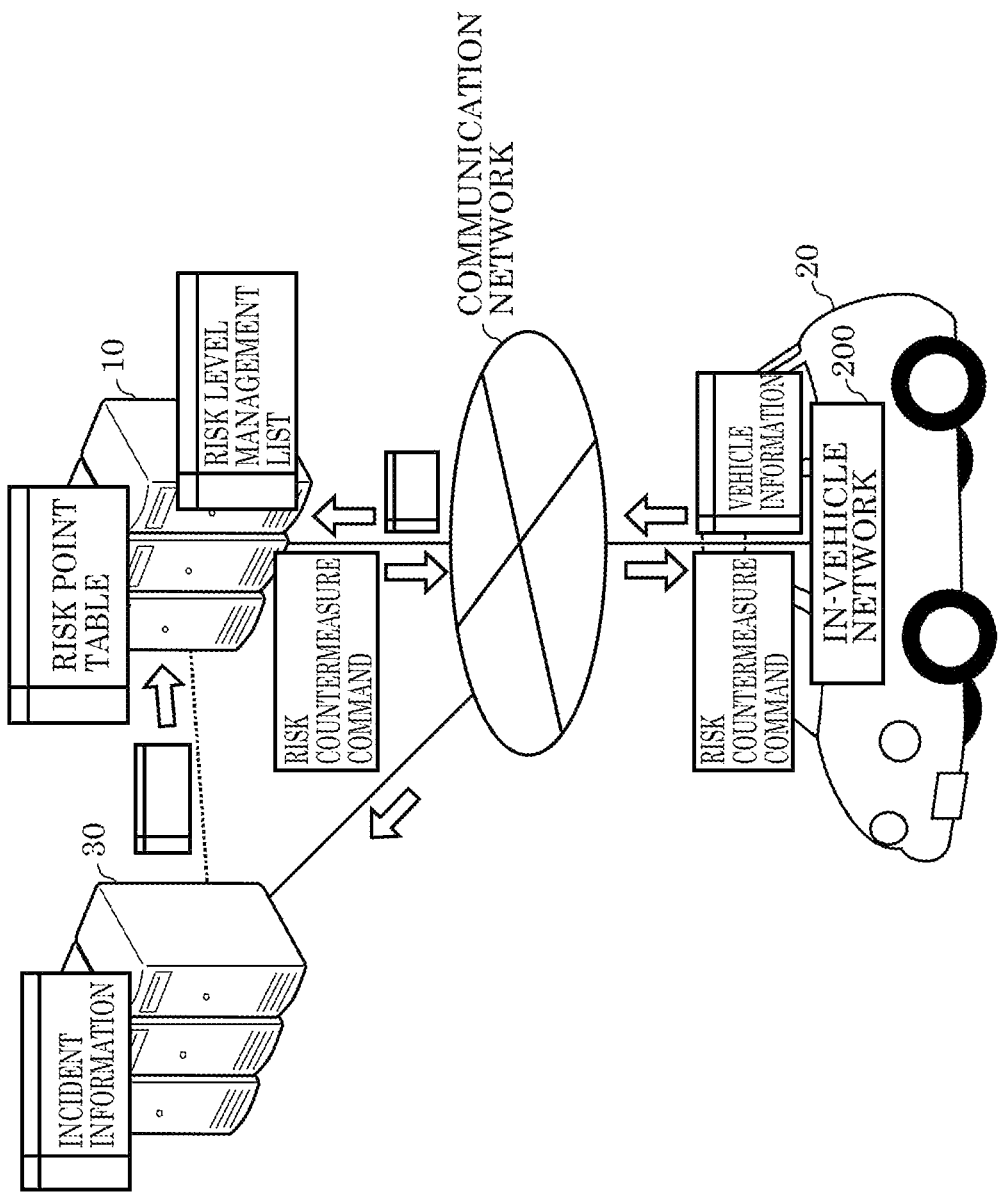
FIG. 1 illustrates an outline of a configuration example of a security risk countermeasure system including an information processing device according to Embodiment 1.

Underlying Knowledge Forming Basis of the Present Disclosure

The inventors of the present application have found that the problems as described above occur because the countermeasures against the cyberattacks described in the section "Background Art" are taken after the detection of anomalies.

In the field of information technology (IT), a mechanism for sharing accumulated threat information has begun to be constructed in order to enable a rapid response even to cyberattacks using new methods while reducing costs. An idea is to introduce a similar mechanism to computerized automobiles as a security measure. However, automobiles differ from each other in their states, and the state of each vehicle is also not constant. Accordingly, the risk level against threats and necessary actions vary from vehicle to vehicle, and can also vary in each vehicle. Hence, simply constructing a mechanism in which information from each vehicle can be collected and security information can be provided to each vehicle may interfere with implementation of both vehicle information security and convenience from use of information.

In order to solve such a problem, an information processing device according to one aspect of the present disclosure is an information processing device that processes information about a first vehicle and information about a second vehicle, the information processing device comprising: a processor; and a memory including at least one set of instructions that, when executed by the processor, causes the processor to perform operations. The operations include: obtaining incident information about an incident of a cyberattack that occurred in a vehicle; obtaining second vehicle information about a state of the second vehicle via communication with the second vehicle; storing, in the memory, the incident information and the second vehicle information; determining a risk level of a vehicle function of the second vehicle based on a degree of matching between the incident information and the second vehicle information;

generating a function restriction command for restricting a vehicle function of the first vehicle corresponding to the vehicle function of the second vehicle, when the risk level is higher than a first criterion, the vehicle function of the first vehicle being one among one or more vehicle functions of the first vehicle; and outputting the function restriction command.

With this, the risk level of the second vehicle according to the state of the second vehicle is determined based on the information about the incidents of the cyberattacks on a plurality of vehicles. When the risk level obtained as a result of the determination is high exceeding the predetermined criterion, restriction on the function of the first vehicle prevents an attack from occurring or adverse effects due to the attack from increasing.

For example, the generating of function restriction command may include generating, as the function restriction command, a function invalidation command for invalidating the vehicle function of the first vehicle corresponding to the vehicle function of the second vehicle, when the risk level is higher than a second criterion that is higher than the first criterion. Moreover, for example, the operations may further include: generating a function restriction cancellation command for cancelling a restriction on the vehicle function of the first vehicle corresponding to the vehicle function of the second vehicle, when the risk level of the vehicle function of the second vehicle is lower than the first criterion, and the outputting may include outputting the function restriction cancellation command.

By changing the degree of restriction on the function according to the risk level in such a manner, it is possible for the vehicle to achieve both safety and convenience in using information.

For example, the determining of risk level may include predetermining the risk level of the vehicle function of the second vehicle, when a traveling state of the second vehicle indicated by the second vehicle information changes. As a specific example, when the traveling state of the second vehicle changes from a moving state to a stopped state, the generating of function restriction cancellation command may include generating the function restriction cancellation command for cancelling a restriction on a communication-related function among the one or more vehicle functions of the first vehicle.

With this, an appropriate function restriction is applied according to the risk level which is changeable depending on the traveling state of the vehicle or necessary countermeasures.

For example, when the incident information stored in the memory includes incident information about an incident that occurred in the second vehicle, the determining of risk level may include determining the risk level of the vehicle function of the second vehicle to be higher than the first criterion.

A vehicle with a record of incidents of cyberattacks has a possibility that some kind of vulnerabilities which allowed the attack or the influence of the attack remain in the vehicle. Hence, it is appropriate to determine that the risk level is high. In the first vehicle, an appropriate function restriction is applied according to the risk level of the second vehicle.

For example, when the risk level of the vehicle function of the second vehicle is higher than a third criterion, and a distance between a traveling position of the first vehicle and a traveling position of the second vehicle is less than or equal to a predetermined distance, the generating of risk countermeasure command may include generating a function restriction command for restricting a traveling system function among the one or more vehicle functions of the first vehicle.

For example, when a vehicle traveling near an own vehicle may pose a threat because the vehicle traveling nearby has a high risk of cyberattacks, and if the nearby vehicle performs unauthorized traveling due to an attack, the nearby vehicle may collide with the own vehicle. In addition, the risk of a cyberattack on the own vehicle, which exchanges information with the nearby vehicle, also increases. For example, fraudulent false information may be provided, or a message with a malicious code embedded may be transmitted to the own vehicle. With the above configuration, an appropriate level of function restriction is applied to the own vehicle according to the changeable risk level of the nearby vehicle or necessary countermeasure. Moreover, in this case, by restricting the function of the traveling system (control system for acceleration/deceleration), the possibility of an accident which may occur when the attack cannot be prevented can be reduced. The distance between vehicles may be calculated, for example, from position information obtained from global positioning system (GPS) of each vehicle, or any method such as delay time of inter-vehicle communication, distance measured by radar, and the like. Additionally, the third criterion may be the same as or different from the first criterion or the second criterion which is compared with the risk level of the first vehicle.

For example, when the distance between the traveling position of the first vehicle and the traveling position of the second vehicle is greater than the predetermined distance, the generating of function restriction cancellation command may include generating the function restriction cancellation command for cancelling a restriction on the traveling system function of the first vehicle.

In other words, a vehicle is a moving body. Even when a vehicle with a high risk of cyberattacks is temporarily positioned nearby and can be a threat if the vehicle is a communication partner, the vehicle will not be a threat when the vehicle is positioned at a distance which does not allow it to be a communication partner. Accordingly, the risk of a vehicle which does not exchange information with the communication partner is reduced. This eliminates the need for a strict function restriction. With the above configuration, an appropriate level of function restriction is applied to the first vehicle according to the risk level which is changeable or necessary countermeasures.

The vehicle function of the first vehicle may be a function related to traveling of the first vehicle, the function related to the traveling of the first vehicle may be one of an automated driving function and a driving support function, and the function restriction command for restricting the vehicle function may be a command for stopping the function related to the traveling of the first vehicle.

The vehicle function of the first vehicle may be a function related to traveling of the first vehicle, the function restriction command for restricting the vehicle function of the first vehicle may be one of a command for setting an upper speed limit of the first vehicle to a predetermined speed and a command for setting a distance between the first vehicle and another vehicle to be greater than or equal to a predetermined distance.

The vehicle function of the first vehicle may be a function related to communication involving the first vehicle, and the function related to the communication involving the first vehicle may be at least one of communication between devices of the first vehicle, communication between the first vehicle and a device of an occupant of the first vehicle, or communication between the first vehicle and a device external to the first vehicle.

The vehicle function of the first vehicle may be a communication function of the first vehicle, and the function restriction command for restricting the vehicle function of the first vehicle may be one of a command for stopping the communication function of the first vehicle and a command for restricting a communication bandwidth of the communication function of the first vehicle to a predetermined bandwidth.

An information processing method according to one aspect of the present disclosure is an information processing method performed by a processor included in an information processing device that processes information about a first vehicle and information about a second vehicle. The information processing method includes: obtaining incident information about an incident of a cyberattack that occurred in a vehicle; obtaining second vehicle information about a state of the second vehicle via communication with the second vehicle; determining a risk level of a vehicle function of the second vehicle based on a degree of matching between the incident information and the second vehicle information; and generating and outputting a function restriction command for restricting a vehicle function of the first vehicle corresponding to the vehicle function of the second vehicle, when the risk level is higher than a first criterion. A recording medium according to one aspect of the present disclosure is a non-transitory computer-readable recording medium having a program for use in an information processing device that includes a processor and a memory, the information processing device processing information about a first vehicle and information about a second vehicle, the program, when executed by the processor using the memory, causing the processor to execute: obtaining incident information about an incident of a cyberattack that occurred in a vehicle; obtaining second vehicle information about a state of the second vehicle via communication with the second vehicle; determining a risk level of a vehicle function of the second vehicle based on a degree of matching between the incident information and the second vehicle information; and generating and outputting a function restriction command for restricting a vehicle function of the first vehicle corresponding to the vehicle function of the second vehicle, when the risk level is higher than a first criterion.

With such a method or recording medium, the risk of the first vehicle according to the state of the vehicle is determined based on the information about incidents of cyberattacks on a plurality of vehicles. When the risk level obtained as a result of the determination is high exceeding a predetermined criterion, the restriction on the function of the first vehicle prevents an attack from occurring and adverse effects due to the attack from increasing.

General and specific aspects disclosed above may be implemented using a system, an integrated circuit, a computer-readable recording medium such as a CD-ROM, or any combination of devices, systems, methods, integrated circuits, computer programs, or recording media.

Hereinafter, embodiments will be specifically described with reference to the drawings.

Note that each of the embodiments described below shows a general or specific example. Numerical values, shapes, materials, structural elements, arrangement positions and connection forms of the structural elements, steps, order of steps, and functional division among functional structural elements shown in the following embodiments are examples, and are not intended to limit the present disclosure. In addition, among the structural elements in the following embodiments, structural elements which are not recited in independent claims are described as optional structural elements.

Embodiment 1

In a security risk countermeasure system including an information processing device according to Embodiment 1, information about incidents of cyberattacks collected from a large number of vehicles (hereinafter, also referred to as incident information) and information about the current state of a vehicle (hereinafter, also referred to as vehicle information) are used to determine the possibility (risk level) of a cyberattack on the functions of the vehicle (hereinafter, also referred to as vehicle functions). The vehicle functions in the present embodiment are classified into communication-related functions and traveling-related functions. Examples of the communication-related functions include functions of Controller Area Network (CAN) communication, Wi-Fi (registered trademark) communication, Bluetooth (registered trademark) communication, and Long-Term Evolution (LTE) communication. The communication-related functions allow information to be exchanged between various types of devices included in a vehicle, between the vehicle and a device of an occupant, or between the vehicle and a device external to the vehicle. Examples of the traveling-related functions include an automated driving function and various kinds of driving support functions. For a vehicle equipped with such functions, a cyberattack is a threat which leads to an anomalous operation. As a countermeasure against this threat, security risk countermeasure system 1 restricts a vehicle function when the risk level of the vehicle function is higher than a predetermined criterion. By restricting the vehicle function, for example, it is possible to prevent unauthorized data from making an intrusion into the in-vehicle network due to a cyberattack. Additionally, even when the unauthorized data penetrates into the in-vehicle network, it is possible to prevent an anomalous operation from occurring due to such data.

[1. Configuration]

FIG. 1 illustrates an outline of a configuration example of security risk countermeasure system 1 including an information processing device according to the present embodiment.

In the configuration example illustrated in FIG. 1, security risk countermeasure server 10, vehicle 20, and incident information collection server 30 are interconnected via a communication network, such as the Internet, so that information can be exchanged between them.

[1.1 Incident Information Collection Server]

Incident information collection server 30 is a security operation center (SOC) server provided by, for example, a vehicle manufacturer, and includes one or more information processing devices including a processor and a memory. Incident information collection server 30 stores, as incident information, a history of incidents related to cyberattacks which have actually occurred in the respective vehicles. FIG. 2 illustrates an example of a data structure of incident information according to Embodiment 1. In the example of the data structure illustrated in FIG. 2, the entries included in the incident information are as described below.

Incident ID: character string for incident identification

Date and time of occurrence: date and time of occurrence of incident

Area of occurrence: area including the place where the incident occurred

Vehicle type: type of vehicle in which the incident occurred

Risk components: components targeted by the attack in the incident. In this example, components are specified by model numbers.

Risk function: Vehicle function affected by the incident

Intrusion route: location on the in-vehicle network where a device used for an unauthorized access to the in-vehicle network is disposed or an unauthorized device is disposed Threat level: evaluation about safety regarding the magnitude of the influence of the incident according to a predetermined criterion. For example, the threat level for the incident of intrusion only which does not affect the operation of in-vehicle devices is low. The threat level for the incident which affects acceleration/deceleration, steering, or perception of surrounding conditions by the driver or sensor is high. Threat levels for other cases are medium.

The entries listed above are examples. Not all of the entries are essential in the present disclosure. The incident information may include entries related to information other than the entries described above. For example, the manufacturer or software version of the risk component, the traveling state (moving or stopped state) of the vehicle when the incident occurred, information for identifying the vehicle in which the incident occurred, and the like may be included.

Since such incident information is collected from a large number of vehicles, the incident information can be said to be a large-scale data asset. At least part of the incident information is provided to security risk countermeasure server 10 as needed. Incident information is provided from incident information collection server 30 to security risk countermeasure server 10 through, for example, a virtual private line (dotted line in FIG. 1), but the present disclosure is not limited to such an example.

It may be that there are a plurality of incident information collection servers 30. For example, incident information may be provided to security risk countermeasure server 10 from the incident information collection server of the SOC of each vehicle manufacturer. The incident information may be described in a format that conforms to, for example, structured threat information expression (STIX), which is an international standard related to threat information, in order to facilitate sharing of the incident information by such a plurality of subjects.

[1.2 Vehicle]

Vehicle 20 is a vehicle for which security risk countermeasure system 1 is currently executing the security risk countermeasure. In the present disclosure, the vehicle for which the security risk countermeasure is currently executed is also referred to as a first vehicle in order to distinguish it from general vehicles or another specific vehicle.

Figure 3:
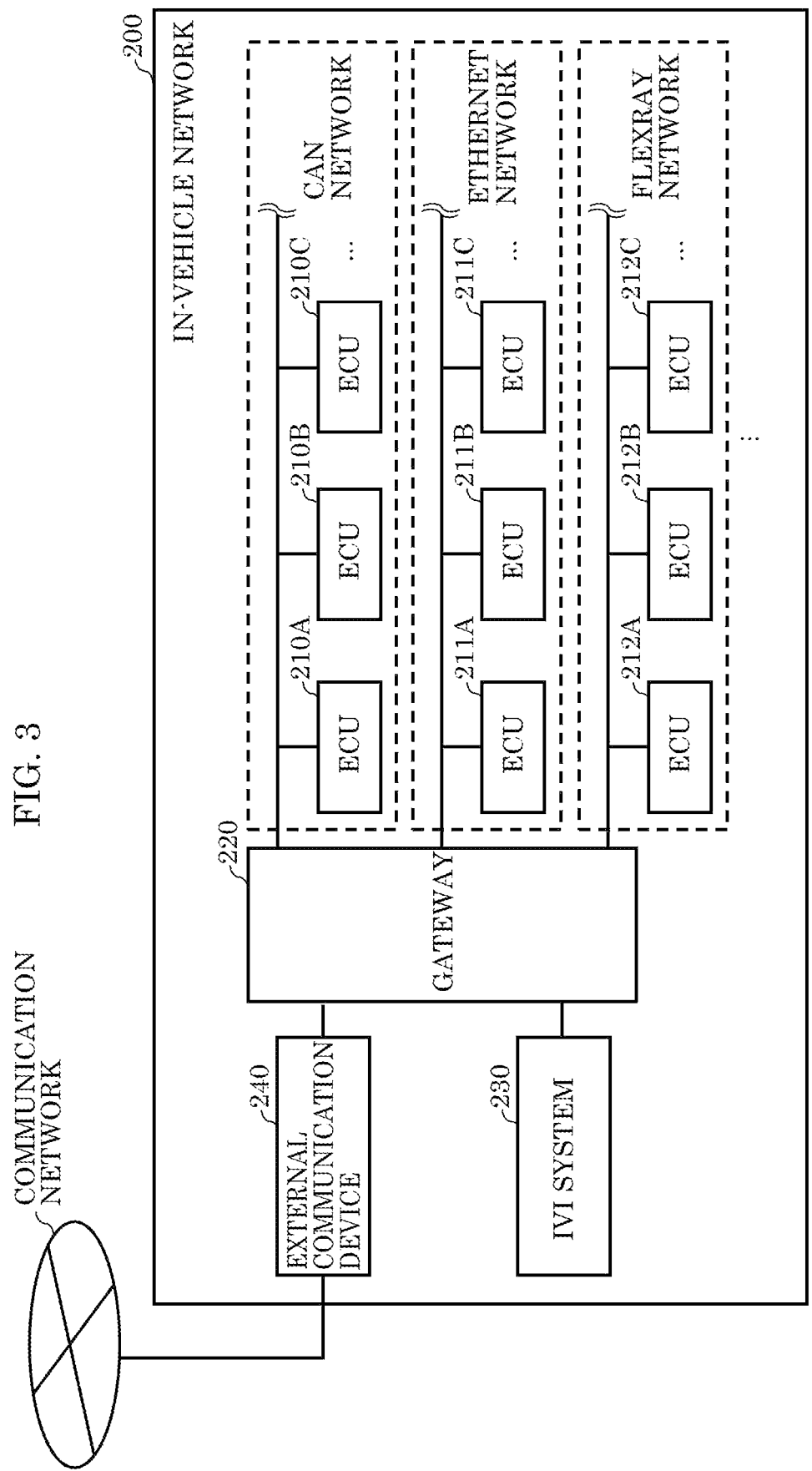
FIG. 3 illustrates a configuration example of an in-vehicle network included in a vehicle to which security risk countermeasures are applied by the security risk countermeasure system.

Vehicle 20 includes in-vehicle network 200. FIG. 3 illustrates a configuration example of in-vehicle network 200.

A large number of electronic control units (ECUs) are connected to in-vehicle network 200. In-vehicle network 200 illustrated in FIG. 3 includes a plurality of sub-networks in accordance with different communication protocols, such as Controller Area Network (CAN), Ethernet (registered trademark), and FlexRay (registered trademark). Each ECU is connected to any one of the sub-networks. Examples of the ECUs include an ECU connected to, for example, sensors (not illustrated) to collect data indicating the state inside or around the vehicle, and an ECU which is connected to an actuator, and which sends a control signal to operate a device in the vehicle. Other examples of the ECUs may include an ECU which performs information processing related to security, such as monitoring data flowing through a network. The vehicle functions described above are realized by any of these ECUs or by coordination involving data exchange between a plurality of ECUs. Sub-networks with different communication protocols are interconnected via gateway 220. Gateway 220 converts data exchanged between the sub-networks between communication protocols.

In addition, in the configuration example, in-vehicle infotainment (IVI) system 230 is connected to in-vehicle network 200.

Each ECU and WI system 230 are connected to an external communication network via gateway 220 and external communication device 240 having a function as a communication module. The information about the occurrence of incidents, which is provided to the SOC, and the vehicle information, which is provided to security risk countermeasure server 10, are also transmitted from any of the ECUs via the above described route. The vehicle information will be described later with specific examples.

[1.3 Security Risk Countermeasure Server]

Security risk countermeasure server 10 uses the incident information obtained from incident information collection server 30 and the vehicle information obtained from vehicle 20 to determine the risk level related to the cyberattacks on the vehicle functions of vehicle 20. Moreover, when the determined risk level is higher than a predetermined criterion, security risk countermeasure server 10 issues a command to restrict one or more vehicle functions of vehicle 20 (hereinafter, also referred to as a function restriction command), and transmits the command to vehicle 20 via a communication network. Security risk countermeasure server 10 includes one or more information processing devices including a processor and a memory.

Figure 4:
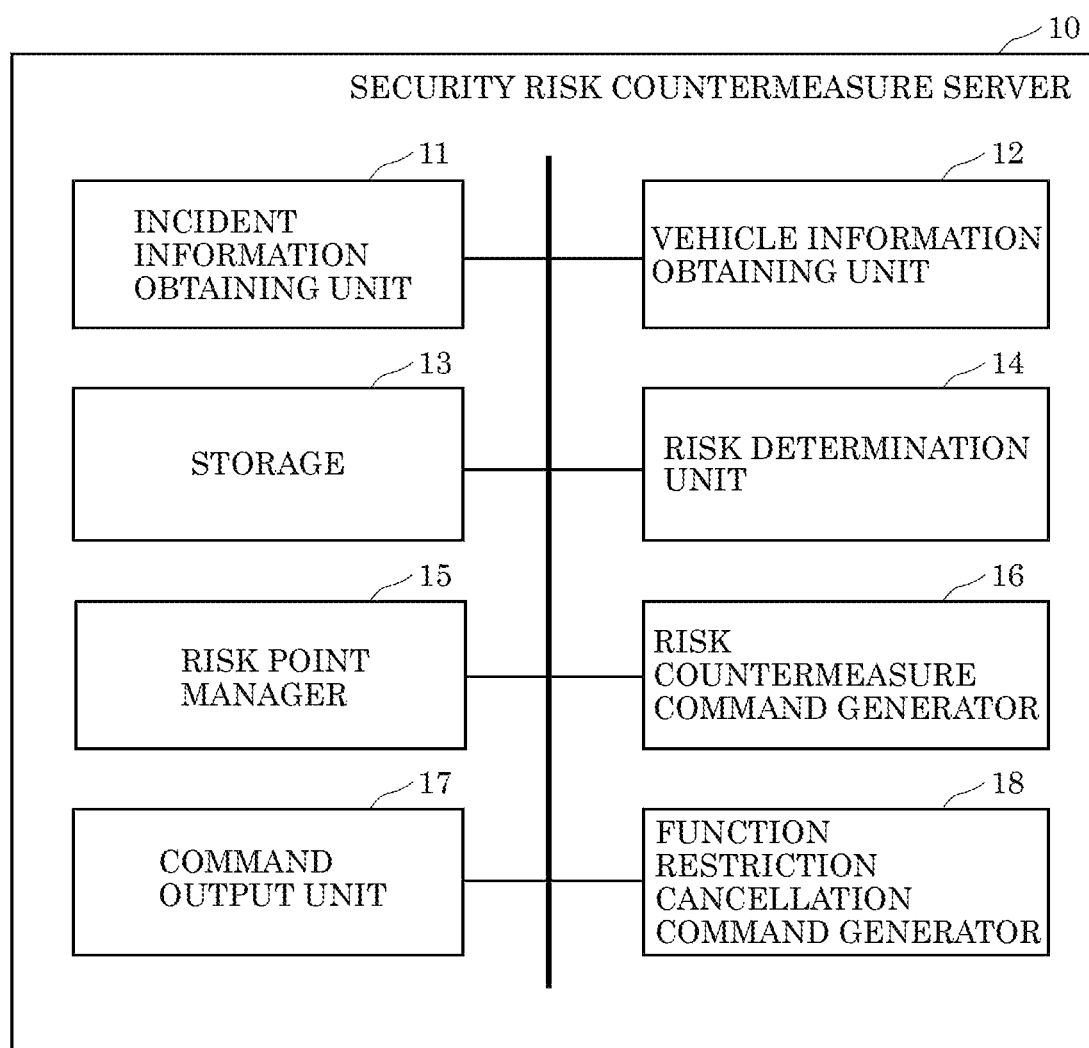
FIG. 4 illustrates a configuration example of a security risk countermeasure server included in the security risk countermeasure system.

FIG. 4 illustrates a configuration example of security risk countermeasure server 10.

Security risk countermeasure server 10 includes, as structural elements, incident information obtaining unit 11, vehicle information obtaining unit 12, storage 13, risk determination unit 14, risk point manager 15, risk countermeasure command generator 16, command output unit 17, and function restriction cancellation command generator 18.

Incident information obtaining unit 11 receives and obtains incident information from incident information collection server 30.

Vehicle information obtaining unit 12 receives and obtains vehicle information which is information about the state of vehicle 20.

Storage 13 stores the incident information, the vehicle information, and other information, to be described later, used for determining the risk level. The risk level management list and the risk point table illustrated in FIG. 1 are also included in other information stored in storage 13, which will be described later with examples.

Risk determination unit 14 determines the risk levels of various types of vehicle functions of vehicle 20 based on the degree of matching between the incident information and the vehicle information of vehicle 20.

Risk point manager 15 manages risk point information, which is a kind of information used by risk determination unit 14 to determine the risk level, based on the incident information.

Risk countermeasure command generator 16 generates a command related to a restriction (including a case of invalidation) on one or more vehicle functions as a risk countermeasure (hereinafter, also referred to as a risk countermeasure command) according to the risk level determined by risk determination unit 14.

Function restriction cancellation command generator 18 generates a command for cancelling the restriction on the vehicle functions (hereinafter, also referred to as a function restriction cancellation command) according to the risk level determined by risk determination unit 14.

Command output unit 17 transmits the function restriction command and the function restriction cancellation command to vehicle 20.

The structural elements of security risk countermeasure server 10 described above may be functional structural elements realized by the processor executing, for example, one or more programs stored in the memory in the information processing device included in security risk countermeasure server 10. The security risk countermeasure process executed by security risk countermeasure system 1 is executed by coordination between the structural elements of security risk countermeasure server 10 while performing the above-mentioned functions.

Note that incident information collection server 30 and security risk countermeasure server 10 do not have to be individually established. For example, incident information collection server 30 and security risk countermeasure server 10 may be an integrated system. Moreover, incident information collection server 30 may be part of security risk countermeasure server 10, and, for example, incident information collection server 30 may function as storage 13. The function of incident information obtaining unit 11 in this case may be to obtain, from storage 13, incident information in a range used for processing.

[2. Operation]

Next, an operation of a security risk countermeasure process executed by security risk countermeasure system 1 will be described.

Figure 5:
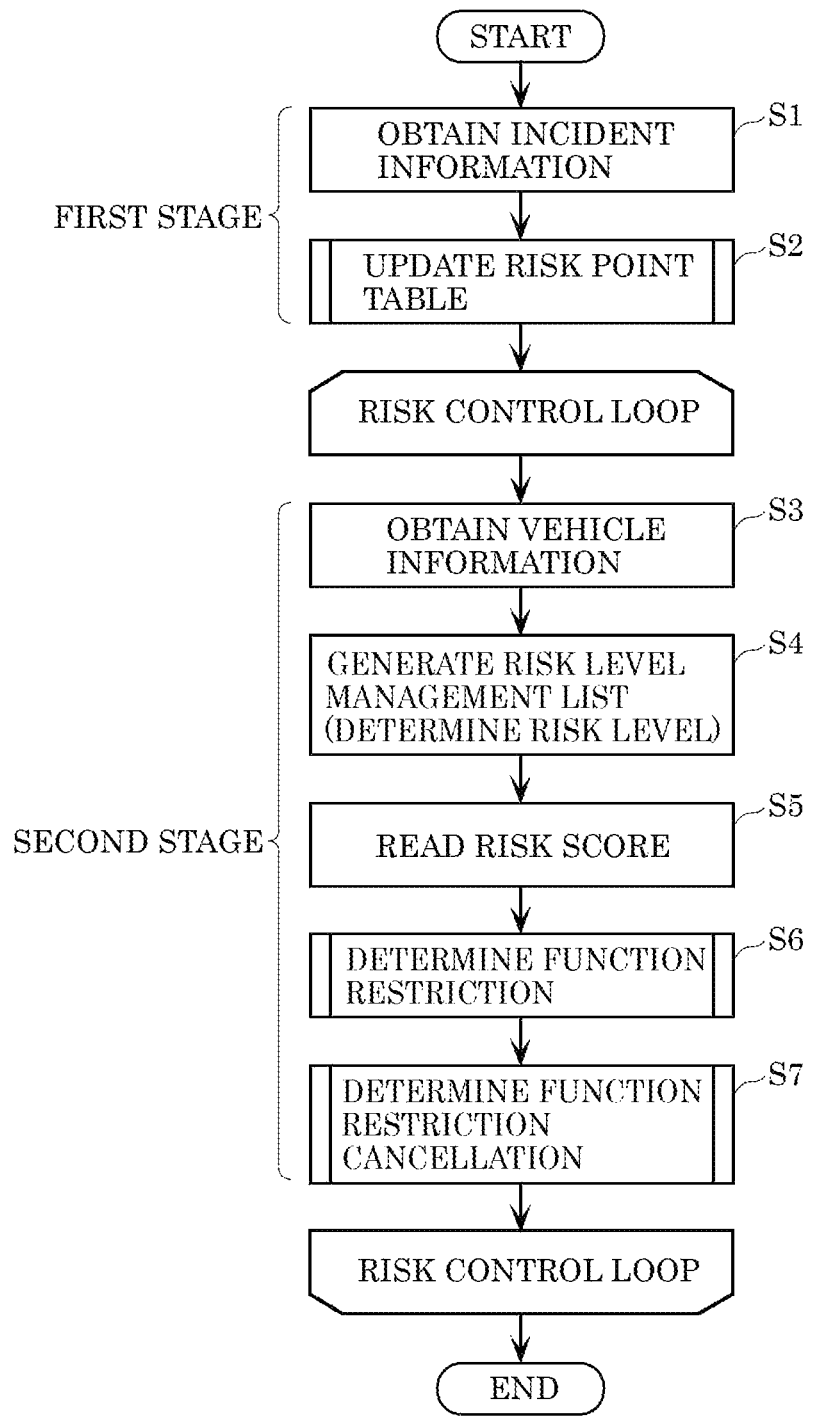
FIG. 5 is a flowchart illustrating an example of steps for a security risk countermeasure process executed by the security risk countermeasure server.

FIG. 5 is a flowchart illustrating an example of steps for the process executed by security risk countermeasure server 10. For the purpose of illustration, the steps will be roughly divided into two stages.

One is a first stage in which incident information about incidents of cyberattacks on a plurality of vehicles is collected, and the risk levels of various states of the vehicle are evaluated based on the incident information and managed as risk points (step S1 and step S2).

The other one is a second stage in which vehicle information indicating the state of the first vehicle, for which security risk countermeasures are to be executed, is obtained, the risk level of each vehicle function of the first vehicle is calculated from the risk point based on the degree of matching between the state of the first vehicle indicated by the obtained vehicle information and the state of the vehicle indicated in the incident information, whether to execute restriction or cancellation of the restriction on the vehicle function is determined based on the calculated risk level, and a risk countermeasure command for the first vehicle is output as necessary (steps S3 to S7).

[2.1 First Stage]

Figure 6:
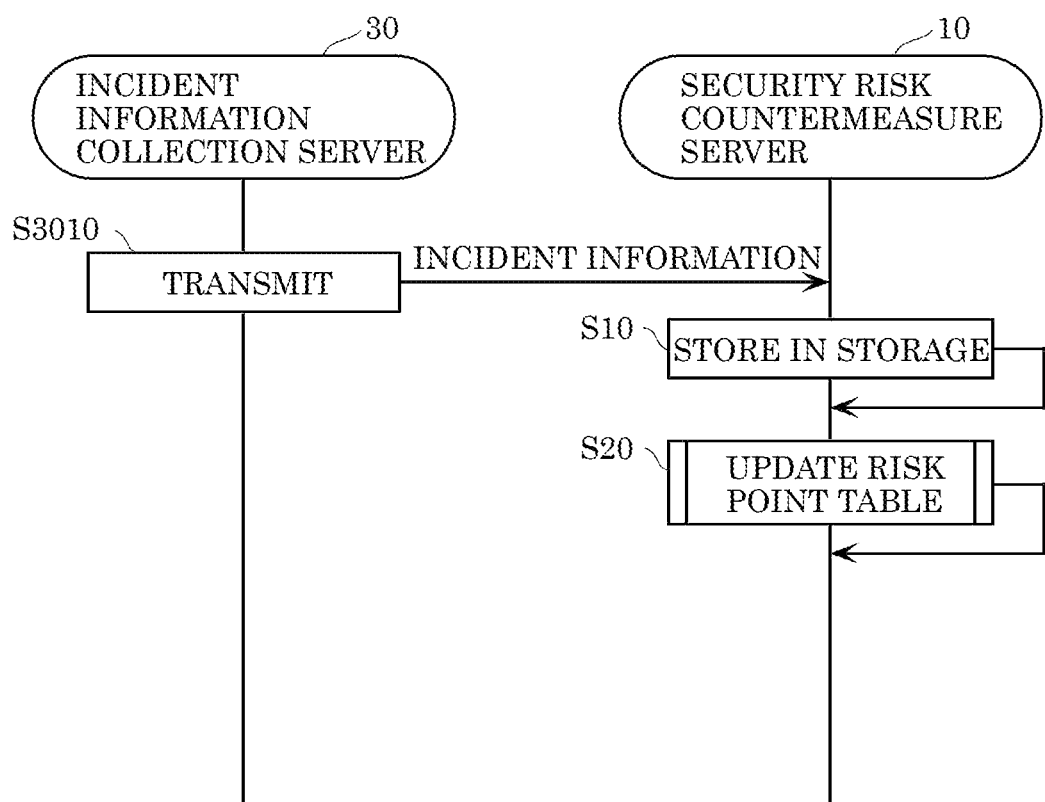
FIG. 6 is a sequence diagram illustrating steps including coordination between an incident information collection server and the security risk countermeasure server in the security risk countermeasure process.

FIG. 6 is a sequence diagram illustrating steps including coordination between incident information collection server 30 and security risk countermeasure server 10. FIG. 6 relates to the first stage in the example of the steps illustrated in FIG. 5.

In the first stage, first, incident information is transmitted from incident information collection server 30 to security risk countermeasure server 10 (step S3010). An example of the data structure of the incident information is illustrated in FIG. 2, and thus, repeated description thereof will be omitted. Transmission of the incident information may be performed at regular time intervals, or may be triggered by the occurrence of a predetermined event, such as when a predetermined number of records are added or a record of an incident with a high threat level is added. The transmission may also be performed in response to a request from security risk countermeasure server 10.

In security risk countermeasure server 10, the incident information received by incident information obtaining unit 11 is stored in storage 13 (step S10). The steps up to this point corresponds to step S1 in the flowchart of FIG. 5. Next, in security risk countermeasure server 10, risk point manager 15 updates the risk point table based on the incident information (step S20). Step S20 corresponds to step S2 in the flowchart of FIG. 5.

The risk point table is a table in which risk evaluation values (risk points) for cyberattacks in various states of the vehicles are summarized, and is stored in storage 13. The risk points are determined based on the incident record indicated by the incident information, and are updated when new incident information is obtained. The process of updating the risk point will be described later with an example.

FIG. 7A to 7G are examples of the risk point table according to the present embodiment.

The risk point table illustrated in FIG. 7A relates to a risk point of each device mounted on a vehicle, that is, of each ECU and IVI system in the example, based on a model number and a software version as the vehicle state. The risk point table illustrated in FIG. 7B relates to a risk point based on a manufacturer of each device mounted on the vehicle as the vehicle state. The risk point table illustrated in FIG. 7C relates to a risk point based on each area in which the vehicle is traveling as the vehicle state. The risk point table illustrated in FIG. 7D relates to a risk point based on each vehicle type as the vehicle state. The risk point table illustrated in FIG. 7E relates to a risk point based on each communication protocol used in the in-vehicle network of the vehicle as the vehicle state. The risk point table illustrated in FIG. 7F relates to a risk point based on each installed vehicle function as the vehicle state. The risk point table illustrated in FIG. 7G relates to a risk point based on a traveling state for each vehicle function validated in the vehicle as the vehicle state. In this example, the traveling state is classified into a total of three states which are states for two different traveling speeds and a stopped state.

By determining the risk point based on the incident information, for example, vulnerability to other cyberattacks or the actual tendency to be easily targeted by attackers according to these states is reflected. Steps for the process of updating (or generating) a risk point table including determination of such risk points will be described below with reference to a flowchart.

Figure 8:
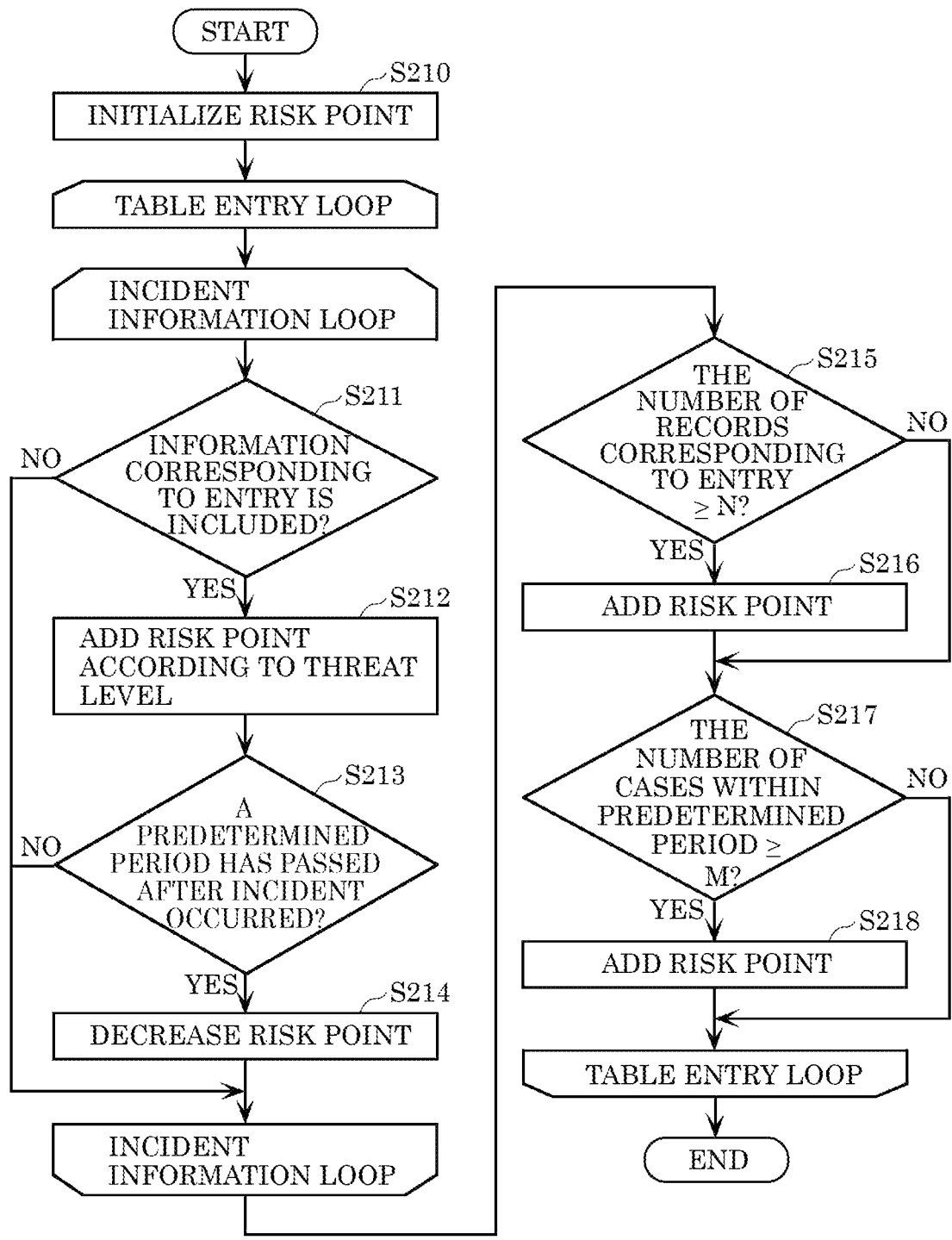
FIG. 8 is a flowchart illustrating an example of steps for a process of updating the risk point table.

FIG. 8 is a flowchart illustrating an example of steps performed by risk point manager 15 for the process of updating each of the risk point tables described above. The process corresponds to step S2 in the flowchart of FIG. 5 and step S20 in the sequence diagram of FIG. 6. The following description should be understood with reference to any of the risk point tables illustrated in FIG. 7A to FIG. 7G and the incident information illustrated in FIG. 2 as appropriate.

Risk point manager 15 first initializes the points in the risk point table (step S210), and sequentially executes step S211 to step S218 described below (table entry loop in FIG. 8) with respect to the entries indicating the types of states included in the risk point table. In the example of the present embodiment, the entries indicating the types of states are arranged to the left of the thick vertical ruled line of each risk point table. In the mounted device risk point table in FIG. 7A, the entries indicating the types of states are "ECU-a", "1.0.1" and the like. In the vehicle type risk point table in FIG. 7D, the entry indicating the types of states are "X", "Y", and the like. In step S211, risk point manager 15 determines whether or not one record of incident information includes information corresponding to the entry indicating the type of the above state. When the record includes the corresponding information (Yes in step S211), a predetermined value according to the threat level in the record is added as a risk point for this entry (step S212). As the predetermined value according to the threat level, a larger value is set for a higher threat level. As a result, a risk point of a larger value is given to the entry related to the incident which has more seriously affected the safe traveling of the vehicle. Such a predetermined value according to the threat level may be managed by a table (not illustrated) held in storage 13, for example.

Next, risk point manager 15 determines whether or not a predetermined period has already passed from the date and time of occurrence included in the record (step S213). When the predetermined period has already passed (Yes in step S213), a predetermined value is subtracted from the risk point after the addition in step S212 (step S214). The adjustment of the risk point is based on that a threat which is older than a certain degree is more likely to have a less threat level compared to at the time of occurrence, as a result of the countermeasures taken by manufacturers of vehicles, ECUs, communication devices and the like.

Note that steps S211 to S214 in the table entry loop are sequentially executed for the records included in the incident information (incident information loop in FIG. 8). In other words, for example, for the vehicle type entry "X" indicating the type of state, risk points corresponding to the threat levels of all records including "X" in the vehicle type field are added, and a predetermined value is subtracted from the risk points according to the number of records older than a certain degree in the record. Note that steps S212 to S214 are omitted for the records which had No in step S211, and step S214 is omitted for the records which had No in step S213.

Next, risk point manager 15 determines whether or not the number of records including the information corresponding to the entry is greater than or equal to predetermined reference value n (step S215). When the number of records is greater than or equal to reference value n (Yes in step S215), risk point manager 15 adds a predetermined value to the risk points in this entry (step S216). The adjustment of the risk point is based on that it is likely that many incident-related states have some kind of factors which led to incidents, such as vulnerabilities.

Next, risk point manager 15 determines whether or not the number of records including the information corresponding to the entry in a predetermined period up to the present is greater than or equal to predetermined reference value m (step S217). When the number of records is greater than or equal to reference value m (Yes in step S217), risk point manager 15 adds a predetermined value to the risk points in this entry (step S218). The adjustment of the risk point is based on that it is likely that there is some kind of tendency of incidents, such as unknown vulnerabilities in this entry have started to be targeted by attackers.

By executing the steps up to this point for all entries which indicate the types of states included in the risk point table, the update of the risk point table is completed. The magnitude of the risk point calculated in such a manner reflects the risk level based on the latest incident information obtained by security risk countermeasure server 10 in various states of the vehicle against cyberattacks.

The risk point table updated in such a manner is used for determination of the risk level of first vehicle 20 to be executed in the next second stage.

[2.2 Second Stage]

[2.2.1 Determination of Risk Level of First Vehicle]

Figure 9:
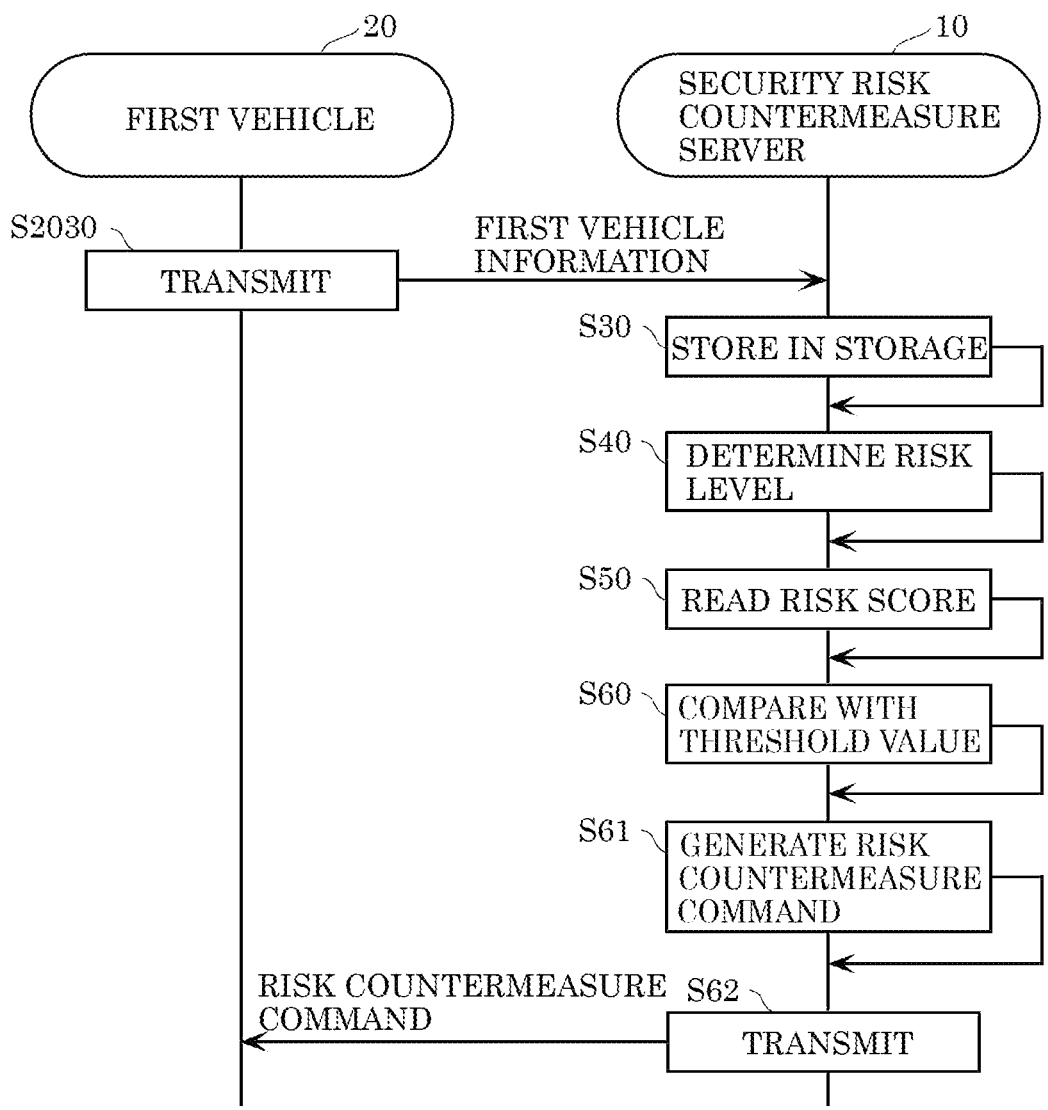
FIG. 9 is a sequence diagram illustrating steps including coordination between a first vehicle and the security risk countermeasure server in the security risk countermeasure process.

FIG. 9 is a sequence diagram illustrating steps including coordination between first vehicle 20 and security risk countermeasure server 10. In addition, the sequence diagram relates to the second stage in the example of the steps illustrated in FIG. 5.

Vehicle information is transmitted from first vehicle 20 to security risk countermeasure server 10 (step S2030). The vehicle information is information about the state of first vehicle 20, and is also referred to as first vehicle information in the following description. FIG. 10 and FIG. 11 each illustrate an example of a data structure of the vehicle information.

The vehicle information in FIG. 10 includes information about devices included in first vehicle 20, and in particular, devices related to information processing or communication. In the following description, the vehicle information in FIG. 10 is also referred to as a device list. Such vehicle information with details that are changed infrequently may be transmitted to security risk countermeasure server 10, for example, by daily processing such as when first vehicle 20 first starts to operate each day, or by being triggered by a specific event, such as when a device configuration is changed on in-vehicle network 200. The change of the device configuration here includes, for example, not only addition or deletion of a device but also software update. Moreover, the related function here is a vehicle function in which the information transmitted and received or processed in another manner by each device is used in first vehicle 20. In other words, it is a vehicle function which can be adversely affected when each device breaks down or is subjected to a cyber attack.

The example of the data structure illustrated in FIG. 11 is an example of vehicle information about the latest various states of first vehicle 20. The vehicle information in FIG. 11 includes information, such as the traveling position and the traveling state which are frequently changed. Hence, for example, the vehicle information may be transmitted to security risk countermeasure server 10 regularly, for example, at a frequency of several minutes or less or each time the state of first vehicle 20 changes.

Note that the entries of information included in the examples of the vehicle information illustrated in FIG. 10 and FIG. 11 are examples, and the present disclosure is not limited to such examples. For example, information including all entries illustrated in FIG. 10 and FIG. 11 may be transmitted as one type of vehicle information. In addition, among the entries illustrated in FIG. 11, entries for which the frequency of changes are relatively low, such as vehicle type, communication protocol, and installed functions, may be transmitted to security risk countermeasure server 10 from first vehicle 20 with a schedule different from the schedule of other entries for which the frequency of changes are high. Moreover, in any of the examples, the information in all entries does not have to be transmitted every time. For example, the vehicle ID for identifying first vehicle 20 in security risk countermeasure server 10 and information of the entry which has been changed from the previous transmission may be transmitted. Moreover, not all of these entries are essential, or other entries may be included. In addition, more detailed information may be included in each entry. For example, the entry of the traveling position is not limited to the information expressed by the area such as the municipality in FIG. 11, but may include information about the latitude and longitude obtained by the GPS receiver included in first vehicle 20.

In security risk countermeasure server 10, the vehicle information received by vehicle information obtaining unit 12 is stored in storage 13 (step S30). The steps up to this point correspond to step S3 in the flowchart of FIG. 5.

Next, in security risk countermeasure server 10, risk determination unit 14 determines the risk level using the risk point tables and vehicle information, and generates a risk level management list (including a case of updating the list) (step S40). Step S40 corresponds to step S4 in the flowchart of FIG. 5. The subsequent steps in the second stage will be described later.

The risk level management list refers to a list of risk levels (the level of the risk) against cyberattacks determined for each vehicle function of first vehicle 20, and is stored in storage 13. In the example illustrated in FIG. 12, the risk level is represented by a risk score calculated using the risk point tables based on the incident information and the vehicle information. Hereinafter, the risk level management list and steps for the process of calculating the risk level will be described using an example.

FIG. 12 illustrates an example of a data structure of the risk level management list in the present embodiment.

The leftmost field indicates the names of the vehicle functions of first vehicle 20. The field to the right of that indicates the type of each vehicle function. The field to the right of that indicates the details of the restriction when each vehicle function is restricted in security risk countermeasure system 1. In addition, the field to the right of that indicates the details of the case where each vehicle function is invalidated in security risk countermeasure system 1. The details of the fields described above are basically unchanged. However, when the number of vehicle functions of first vehicle 20 increases or decreases, the row related to the vehicle function is added to or deleted from the list. Moreover, when the operating rules related to the restriction or invalidation of the vehicle functions of first vehicle 20 changes in security risk countermeasure system 1, the details of each field can be changed.

The risk level of each vehicle function determined by risk determination unit 14 is represented by the risk score entered in the rightmost field in this example. The steps for the process of calculating the risk score entered in the above field will be described below with reference to a flowchart.

Figure 13:
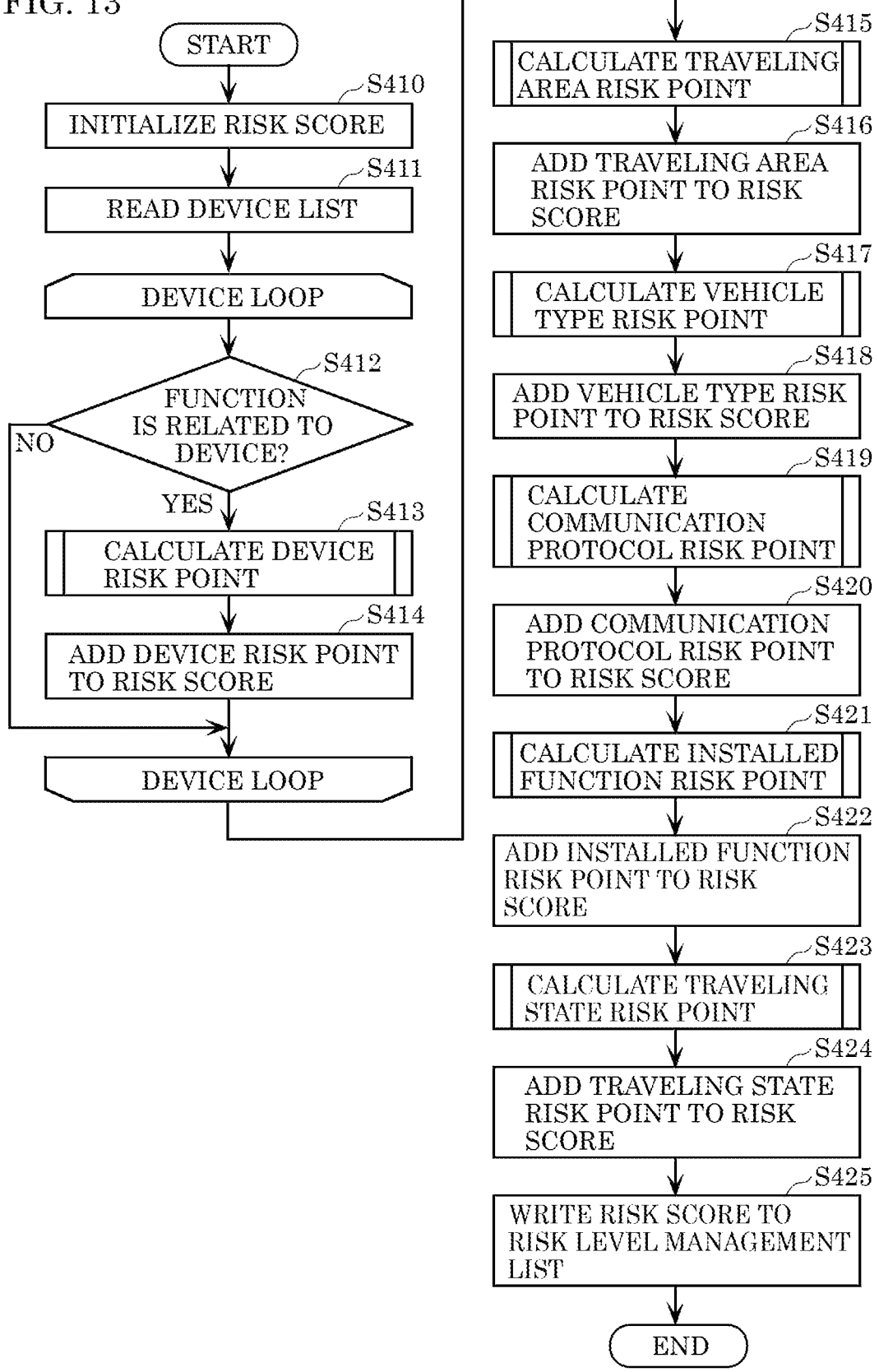
FIG. 13 is a flowchart illustrating an example of steps for a process of calculating a risk score included in the risk level management list.

FIG. 13 is a flowchart illustrating an example of steps for the process of calculating the risk score performed by risk determination unit 14. The process corresponds to step S4 in the flowchart of FIG. 5 and step S40 in the sequence diagram of FIG. 9. The following description should be understood by appropriately referring to the risk point tables illustrated in FIG. 7A to FIG. 7G, the vehicle information illustrated in FIG. 10 and FIG. 11, and the risk level management list illustrated in FIG. 12. In the following description, an example will be described where risk determination unit 14 of security risk countermeasure server 10 which has obtained the vehicle information illustrated in FIG. 11 calculates a risk score for the vehicle function of "automated driving" in the field of the traveling state in the vehicle information.

Risk determination unit 14 first initializes the risk score in the risk level management list (step S410). Next, when risk determination unit 14 reads the device list of FIG. 10 which is the vehicle information stored in storage 13 (step S411), risk determination unit 14 sequentially executes steps S412 to S414 for the devices whose model numbers are listed in the device list (device loop in FIG. 13).

In step S412, risk determination unit 14 determines whether or not the vehicle function is associated with the device. This determination is performed based on the information about the related functions in the device list illustrated in FIG. 10. In this example in which the risk score for the vehicle function "automated driving" is calculated, in step S412 for the model number "ECU-a", it is determined that the vehicle function is associated with the device (Yes in step S412).

Figure 14A:
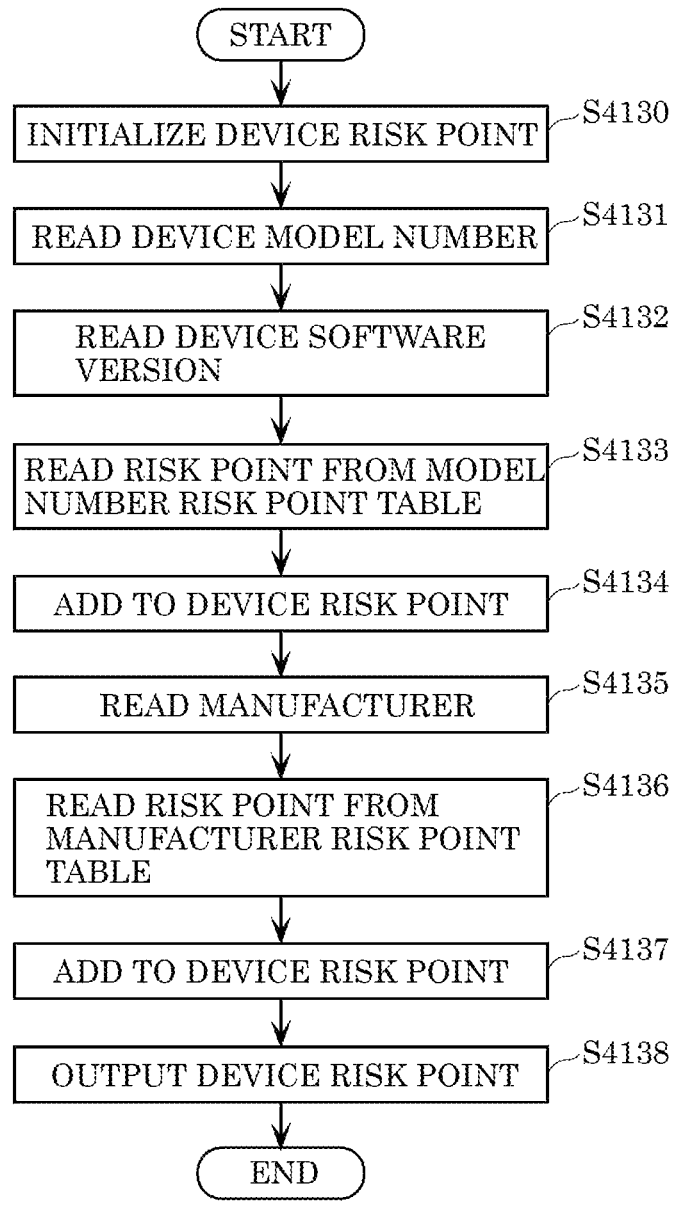
FIG. 14A is a flowchart illustrating an example of steps for a process of calculating a risk point of an in-vehicle device of the first vehicle in the security risk countermeasure process.

When Yes in step S412, risk determination unit 14 calculates the risk point of this device (step S413). FIG. 14A is an example of steps for the process of calculating a risk point of each device included in first vehicle 20.

Risk determination unit 14 first initializes the risk point of a device included in first vehicle 20, and then reads, from the device list, the model number and the software version of the device for which the risk point is to be calculated (steps S4130, S4131, S4132).

Next, risk determination unit 14 refers to the device risk point table illustrated in FIG. 7A, and reads the risk point corresponding to the model number and the software version read in steps S4131 and S4132 (step S4133). In this example, risk determination unit 14, which has read the model number "ECU-a" and the software version "1.0.2" at the top of the device list illustrated in FIG. 10, reads the risk point "2" from the risk point table in FIG. 7A. The risk point read in step S4133 is added to the risk point of the device (step S4134).

Next, risk determination unit 14 reads the manufacturer of the device (step S4135), and reads the risk point corresponding to the read manufacturer with reference to the device manufacturer risk point table illustrated in FIG. 7B (step S4136). In this example, risk determination unit 14, which has read the manufacturer "Company A" at the top of the device list illustrated in FIG. 10, reads risk point "1" from the risk point table in step S4136. The risk point read in step S4136 is added to the risk point of the device (step S4137). In other words, in this example, the risk point of the device after step S4137 is 2+1=3. Risk determination unit 14 outputs the risk point as the risk point of the device (step S4138), and ends the calculation of the risk point of the device.

The risk point output in step S4138 is added to the risk score of the vehicle function for which the risk score is currently calculated, that is, the risk score of "automated driving" in this example (step S414). After the execution of step S414 or when No in step S412, the process of risk determination unit 14 returns to step S412 in the flowchart of FIG. 13. Then, the determination is performed as to whether the vehicle function "automated driving" is related to the next device in the device list of FIG. 10. Subsequently, risk determination unit 14 executes the device loop for all the devices included in the device list.

The magnitude of the risk point of each device included in first vehicle 20 calculated in such a manner reflects the risk level of the in-vehicle device based on the incident information of cyberattacks including the ones which have occurred in the vehicles other than first vehicle 20.

From step S415, risk determination unit 14 uses the vehicle information illustrated in FIG. 11 to determine the risk level of cyberattacks regarding the state of first vehicle 20 other than the devices.

Figure 14B:
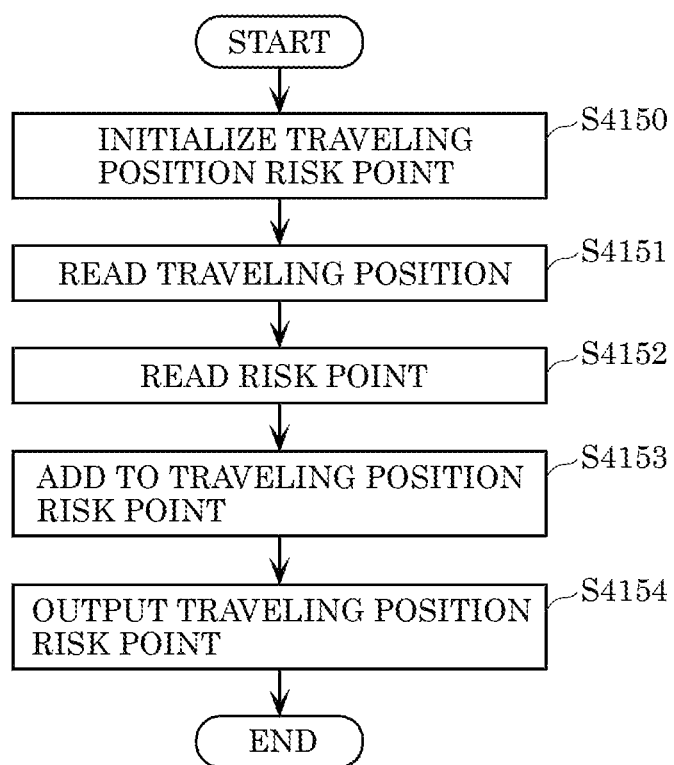
FIG. 14B is a flowchart illustrating an example of steps for a process of calculating a risk point of a traveling position of the first vehicle in the security risk countermeasure process.

In step S415, a risk point indicating the risk level regarding the traveling position as the state of first vehicle 20 is calculated. FIG. 14B is an example of steps for the process of calculating a risk point of a traveling position of first vehicle 20.

Risk determination unit 14 first initializes the risk point of the traveling position, and then reads the traveling position of first vehicle 20, for which the risk point is to be calculated, from the vehicle information in FIG. 11 (steps S4150, S4151).

Next, risk determination unit 14 refers to the risk point table of the traveling position illustrated in FIG. 7C to read the risk point corresponding to the traveling position read in step S4151 (step S4152). In this example, risk determination unit 14, which has read the traveling position "XX ward, Tokyo" in the vehicle information illustrated in FIG. 11, reads the risk point "2" from the risk point table in FIG. 7C. The risk point read in step S4152 is added to the risk point of the traveling position initialized in step S4150, and is output (steps S4153, S4154). Then, the calculation of the risk point for the traveling position ends.

The risk point output in step S4154 is added to the risk score of the vehicle function for which the risk score is currently calculated, that is, the risk score of "automated driving" after step S414 in this example (step S416).

Figure 14C:
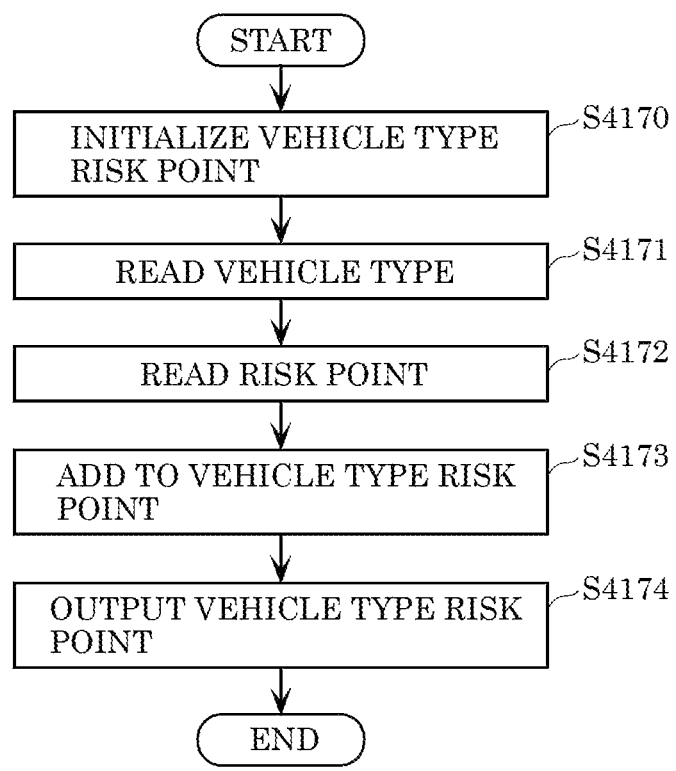
FIG. 14C is a flowchart illustrating an example of steps for a process of calculating a risk point of a vehicle type of the first vehicle in the security risk countermeasure process.

Subsequently, in step S417, a risk point indicating the risk level for the vehicle type as the state of first vehicle 20 is calculated. FIG. 14C is an example of steps for the process of calculating a risk point of the vehicle type of first vehicle 20.

Risk determination unit 14 first initializes the risk point of the vehicle type, and then reads the vehicle type of first vehicle 20, for which the risk point is to be calculated, from the vehicle information in FIG. 11 (steps S4170, S4171).

Next, risk determination unit 14 refers to the vehicle type risk point table illustrated in FIG. 7D to read the risk point corresponding to the vehicle type read in step S4171 (step S4172). In this example, risk determination unit 14, which has read the vehicle type "X" in the vehicle information illustrated in FIG. 11, reads the risk point "1" from the risk point table in FIG. 7D. The risk point read in step S4172 is added to the risk point of the vehicle type initialized in step S4170, and is output (steps S4173, S4174). Then, the calculation of the risk point for the vehicle type ends.

The risk point output in step S4174 is added to the risk score of the vehicle function, for which the risk score is currently calculated, that is, the risk score of "automated driving" after step S416 in this example (step S418).

Figure 14D:
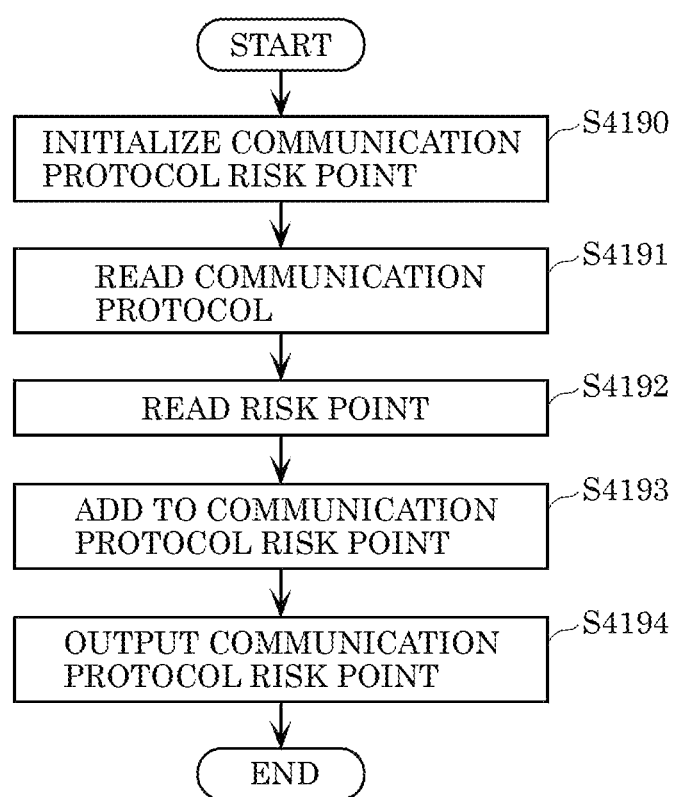
FIG. 14D is a flowchart illustrating an example of steps for a process of calculating a risk point of a communication protocol of the first vehicle in the security risk countermeasure process.

Subsequently, in step S419, a risk point indicating the risk level for the communication protocol being used as the state of first vehicle 20 is calculated. FIG. 14D is an example of steps for the process of calculating the risk point for the communication protocol being used in first vehicle 20.

Risk determination unit 14 first initializes the risk point of the communication protocol, and then reads the communication protocol being used in first vehicle 20, for which the risk point is to be calculated, from the vehicle information in FIG. 11 (steps S4190, S4191).

Next, risk determination unit 14 refers to the intrusion route risk point table illustrated in FIG. 7E to read the risk point corresponding to the communication protocol read in step S4191 (step S4192). In this example, risk determination unit 14, which has read the communication protocols "CAN", "FlexRay" and "MOST" in the vehicle information illustrated in FIG. 11, reads the risk points "8", "1", and "2" associated with the communication protocols from the risk point table in FIG. 7E. The risk points read in step S4192 are added to the risk point of the communication protocol initialized in step S4170, and are output (steps S4193, S4194). The calculation of the risk points for the communication protocol then ends.

The risk point output in step S4194 is added to the risk score of the vehicle function for which the risk score is currently calculated, that is, the risk score of "automated driving" after step S418 in this example (step S420).

Figure 14E:
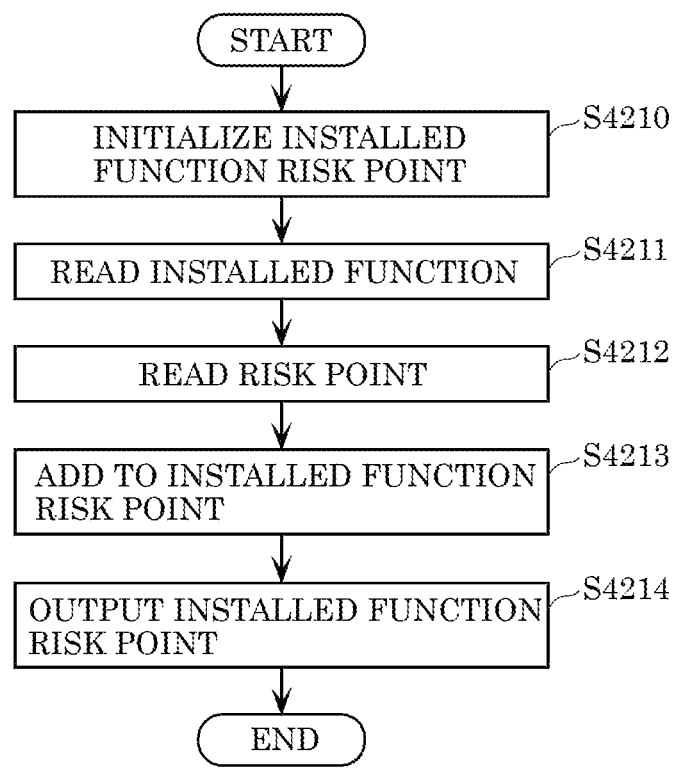
FIG. 14E is a flowchart illustrating an example of steps for a process of calculating a risk point of an installed function of the first vehicle in the security risk countermeasure process.

Next, in step S421, a risk point indicating the risk level of each vehicle function which is installed (indicated as the installed function in each drawing) as the state of first vehicle 20 is calculated. FIG. 14E is an example of steps for the process of calculating a risk point of a vehicle function installed in first vehicle 20.

Risk determination unit 14 first initializes the risk point of each of the installed vehicle functions, and then reads the installed vehicle function of first vehicle 20 for which the risk point is to be calculated, from the vehicle information in FIG. 11 (steps S4210 and S4211).

Next, risk determination unit 14 refers to the installed vehicle function risk point table illustrated in FIG. 7F to read the risk points corresponding to the installed vehicle functions read in step S4211 (step S4212). In this example, risk determination unit 14, which has read the installed vehicle functions "driving support", "automated driving", and "Wi-Fi" included in the vehicle information illustrated in FIG. 11, reads the risk points "5", "20", and "10" associated with the function names from the risk point table in FIG. 7F. The risk points read in step S4212 are added to the risk points of the installed vehicle functions initialized in step S4210, and are output (steps S4213 and S4214). The calculation of the risk points for the installed vehicle functions then ends.

The risk point output in step S4214 is added to the risk score of the vehicle function, for which the risk score is currently calculated, that is, the risk score of "automated driving" after step S420 in this example (step S422).

Figure 14F:
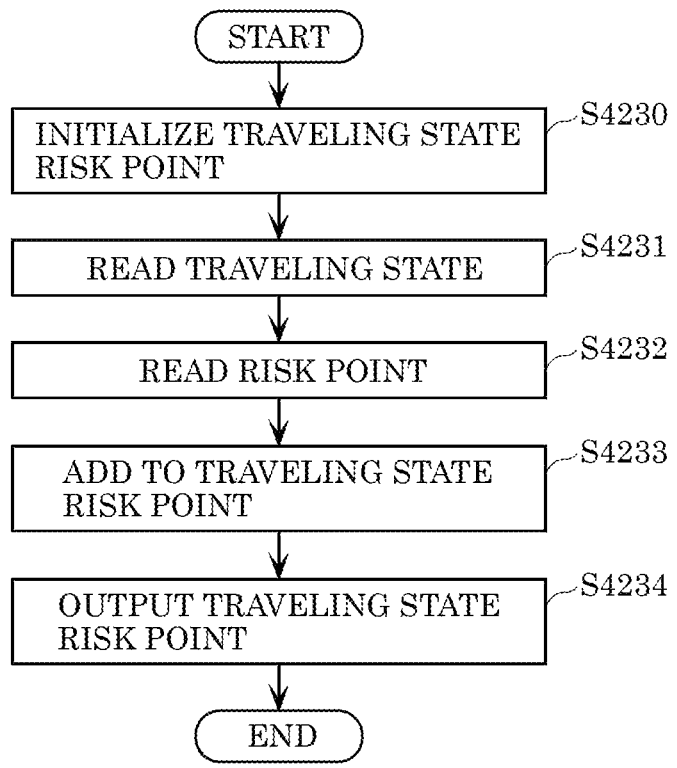
FIG. 14F is a flowchart illustrating an example of steps for a process of calculating a risk point of a traveling state of the first vehicle in the security risk countermeasure process.

Subsequently, in step S423, a risk point indicating the risk level regarding the traveling state as the state of first vehicle 20 is calculated. FIG. 14F is an example of steps for the process of calculating a risk point of the traveling state of first vehicle 20.

Risk determination unit 14 first initializes the risk point of the traveling state, and then reads the traveling state of first vehicle 20, for which the risk point is to be calculated, from the vehicle information in FIG. 11 (steps S4230, S4231).

Next, risk determination unit 14 refers to the traveling state risk point table illustrated in FIG. 7G to read the risk point corresponding to the traveling state read in step S4231 (step S4232). In this example, risk determination unit 14, which has read the traveling states, "automated driving" and "stop" from the vehicle information illustrated in FIG. 11, reads risk point "3" corresponding to "stop" under the function name "automated driving" from the risk point table in FIG. 7G. The risk point read in step S4232 is added to the traveling state risk point initialized in step S4230, and is output (steps S4233, S4234). The calculation of the risk point regarding the traveling state then ends.

The risk point output in step S4234 is added to the risk score of the vehicle function, for which the risk score is currently calculated, that is, the risk score of "automated driving" after step S422 in this example (step S424).

By the steps up to this point, risk points for various entries related to the state of first vehicle 20 (devices, traveling position, vehicle type, communication protocol, installed function, traveling state which are related to automated driving) are calculated, and the sum of the risk points is calculated as the risk score for automated driving. Risk determination unit 14 writes the risk score calculated in such a manner into the field of the risk score for automated driving in the risk level management list illustrated in FIG. 12 (step S425). A risk level management list is generated in such a manner.

As described above, security risk countermeasure server 10 obtains incident information collected from a large number of vehicles including vehicles other than the first vehicle for which the security risk countermeasures are currently executed. The incident information indicates the state of each vehicle at the time of occurrence of the cyberattacks and the threat level of each cyberattack which have actually occurred. Then, based on the incident information, risk points for various states of the vehicle at the time of occurrence of a cyberattack are digitized according to the number of occurrences, the time of occurrence, the threat level, and the like, and are obtained.

Moreover, in security risk countermeasure server 10, among the states of the vehicle indicated by the vehicle information obtained from the first vehicle, the risk points for the states which match the state of the vehicle at the time of occurrence of the cyberattack indicated by the incident information are added up and calculated as a risk score. In other words, as the degree of matching between the state of the first vehicle indicated by the vehicle information and the state indicated by the incident information increases, the risk score increases. The risk score increases when the state of the first vehicle matches the state of the vehicle at the time of occurrence of a more recent, more frequent, or more threatening cyberattack.

Such a risk score indicates the level of possibility (risk level) that the first vehicle, which is in the state indicated by the vehicle information, is likely to be attacked by a cyberattack. Moreover, the latest incident information obtained by security risk countermeasure server 10 is used for quantifying the risk points. For example, cases of cyberattacks which have not occurred in the first vehicle or the tendency thereof can also be reflected. Accordingly, the risk score indicates the risk level of not only a cyberattack known to the vehicle, but also a cyberattack unknown to the vehicle itself.

Next, the steps for the risk control process in the first vehicle using such a risk score will be described.

[2.2.2 Risk Control According to Risk Level (Up to Function Restriction)]

Figure 15:
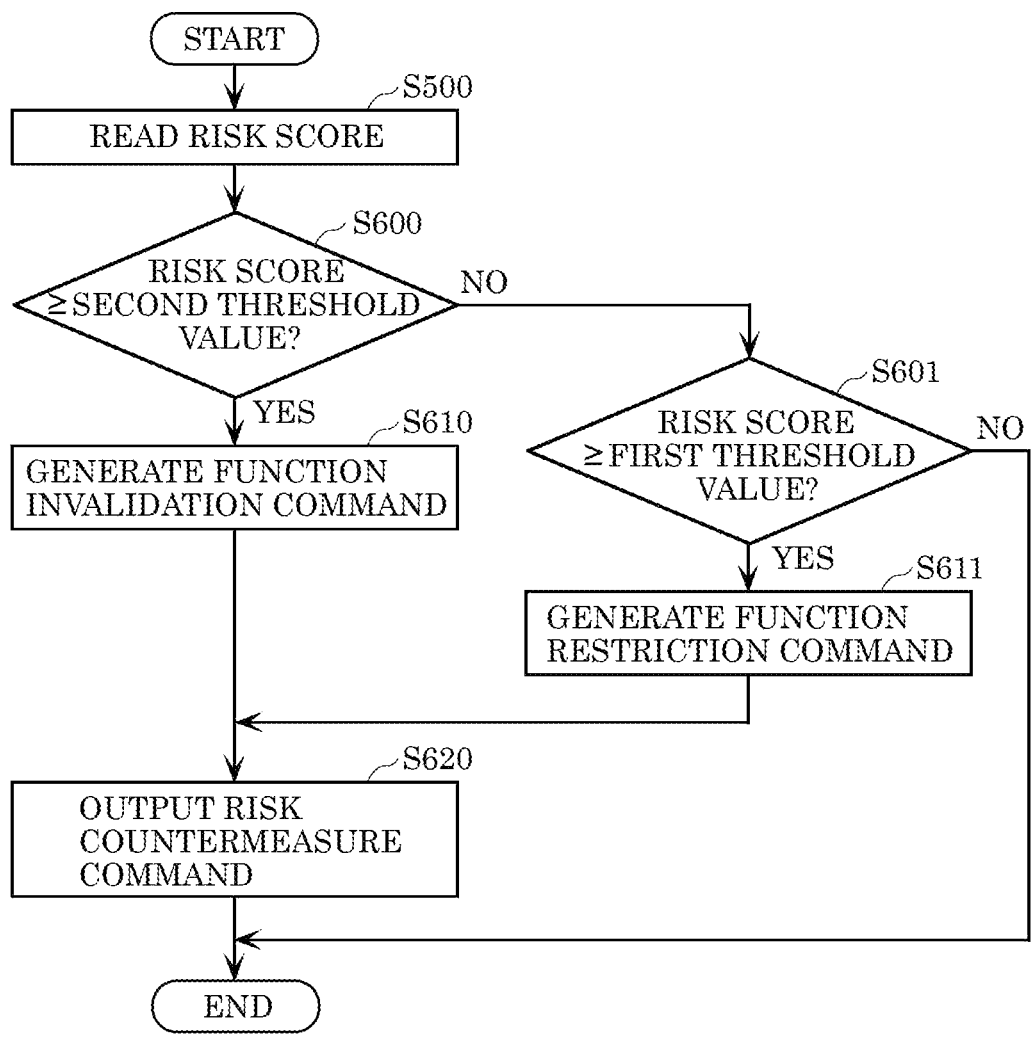
FIG. 15 is a flowchart of an example of steps for a risk control process using the risk score included in the risk level management list.

FIG. 15 is a flowchart illustrating an example of steps for a risk control process executed by security risk countermeasure server 10 using the risk score included in the risk level management list. FIG. 15 is related to part of the second stage in the example of the steps in FIG. 5.

First, risk determination unit 14 reads the risk score of each of the currently validated vehicle functions included in the risk level management list (step S500). The step corresponds to step S5 in the flowchart of FIG. 5 and step S50 in the sequence diagram of FIG. 9.

In the following steps, the risk score and two threshold values (a first threshold value and a second threshold value) related to the risk score are used to determine whether to restrict (including invalidate) the validated vehicle function. The first threshold value is a criterion indicating a risk level for determining whether to restrict the vehicle function. The second threshold value is a risk score value which is higher than the first threshold value, and is a criterion indicating a higher risk level for determining whether to invalidate the vehicle function. The first threshold value is an example of a first criterion in the present embodiment, and the second threshold value is an example of a second criterion in the present embodiment.

Risk determination unit 14 determines whether the risk score read in step S500 is higher than or equal to the second threshold value (step S600). When the risk score is lower than the second threshold value (No in step S600), risk determination unit 14 further determines whether the risk score is higher than or equal to the first threshold value (step S601). Steps S600 and S601 correspond to step S6 in the flowchart of FIG. 5 and step S60 in the sequence diagram of FIG. 9.

When the risk score is lower than the first threshold value (No in step S601), the vehicle function is neither restricted nor invalidated, and the risk control process ends.

When the risk score is higher than or equal to the second threshold value (Yes in step S600), risk determination unit 14 causes risk countermeasure command generator 16 to generate a command for invalidating the vehicle function (hereinafter, also referred to as a function invalidation command). Risk countermeasure command generator 16 generates a function invalidation command in accordance with the details of the "invalidation" field of the risk control target vehicle function in the risk level management list (step S610). The generated function invalidation command is output from command output unit 17 (step S620), and is transmitted to first vehicle 20.

When the risk score is lower than the second threshold value and is higher than or equal to the first threshold value (Yes in step S601), risk determination unit 14 causes risk countermeasure command generator 16 to generate a command for restricting the vehicle function (hereinafter, also referred to as function restriction command). Risk countermeasure command generator 16 generates a function restriction command according to the details of the "restriction" field of the risk control target vehicle function in the risk level management list (step S611).

The generated function restriction command is output from command output unit 17 (step S620), and is transmitted to first vehicle 20. Steps S610 and S611 correspond to step S61 in the sequence diagram of FIG. 9. Step S620 corresponds to step S62 in the sequence diagram of FIG. 9.

In such a manner, the vehicle function is restricted according to the risk score, that is, the risk level calculated in the first stage by the process whose examples are illustrated in the flowchart of FIG. 15. When the possibility that a validated vehicle function will be subjected to a cyberattack is higher than or equal to a certain level, restriction on the vehicle function will prevent an attacker from making an intrusion to the in-vehicle network, unauthorized data from being transmitted, or adverse effects from occurring or increasing even if unauthorized data is transmitted.

[2.2.3 Risk Control According to Risk Level (Including Redetermination of Risk Level)

The steps for the process of determining whether to restrict the vehicle function of first vehicle 20 according to the state of first vehicle 20 have been described. In the following, steps for the process of changing the restriction on the vehicle function when the state of first vehicle 20 changes will be described using an example. As a result, it is possible to take a risk countermeasure which can quickly respond to changes in the state of first vehicle 20.

Note that, as described above, the traveling position and the traveling state in the vehicle information illustrated in FIG. 11 can change relatively frequently. When the traveling position or the traveling state changes, security risk countermeasure server 10 may correct the risk score only for these points (redetermination of the risk level). As a result, it is possible to prevent an increase in the load imposed on security risk countermeasure server 10 and prolongation of the risk level determination execution cycle. This leads to risk countermeasures which can quickly respond to changes in the state of first vehicle 20. Hereinafter, steps for the process of adding a change to the restriction on the vehicle function will be described using two examples where the traveling position changes and where the traveling state changes.

Figure 16A:
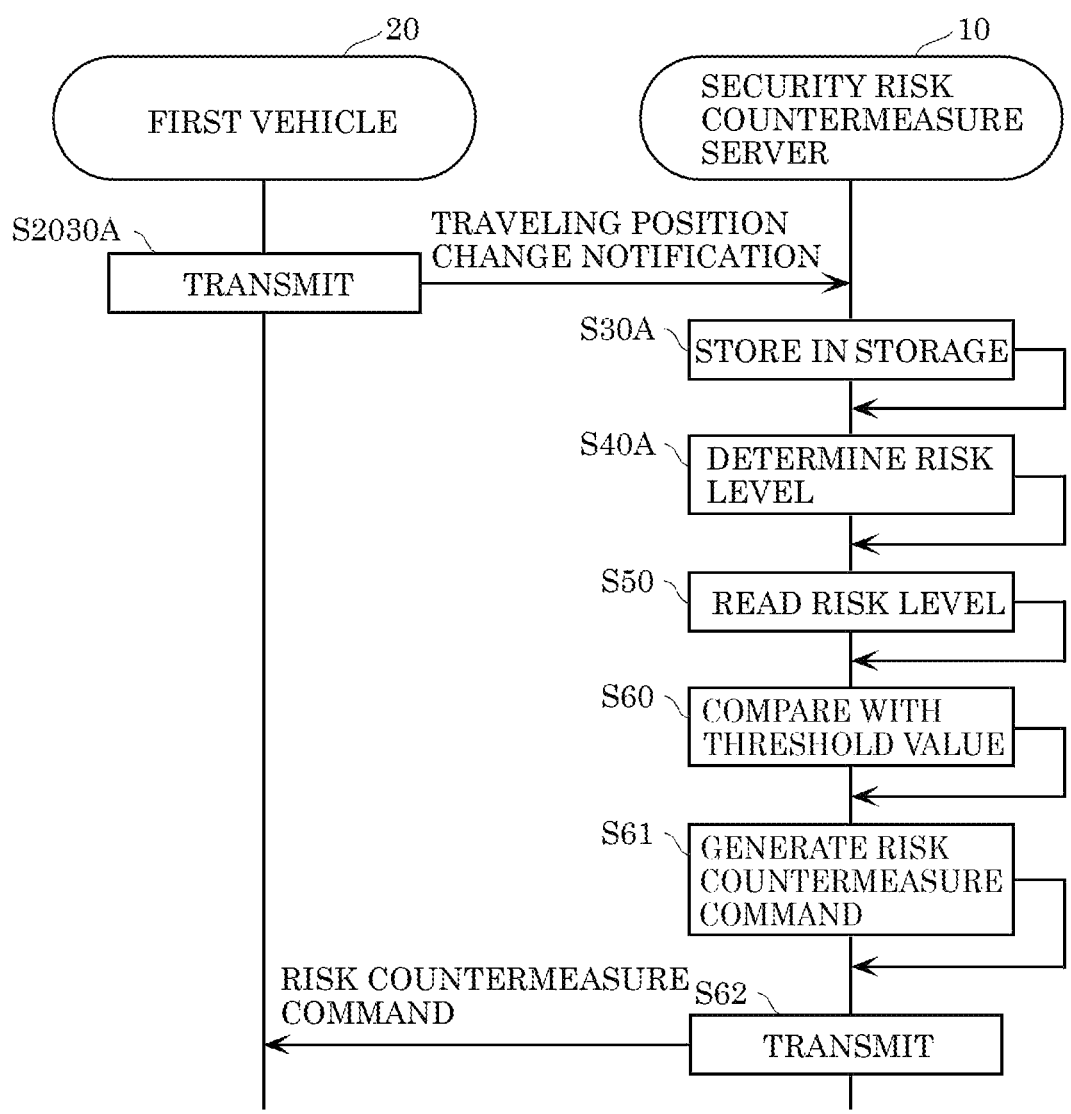
FIG. 16A is a sequence diagram illustrating steps including coordination between the first vehicle and the security risk countermeasure server in the security risk countermeasure process.
Figure 16B:
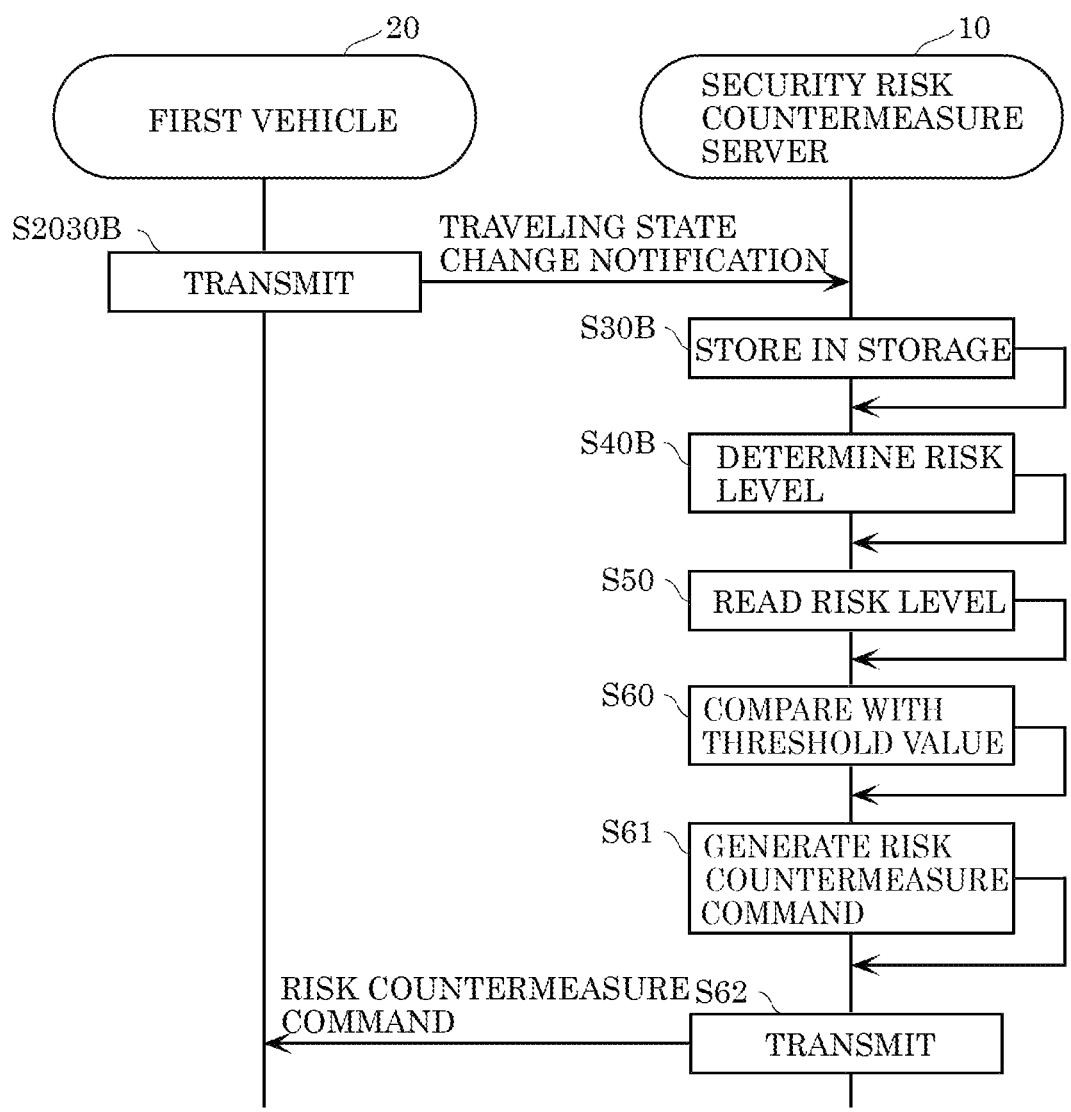
FIG. 16B is a sequence diagram illustrating steps including coordination between the first vehicle and the security risk countermeasure server in the security risk countermeasure process.

FIG. 16A and FIG. 16B are sequence diagrams illustrating steps including coordination between first vehicle 20 and security risk countermeasure server 10. Each sequence diagram illustrates a modified version of the steps illustrated in the sequence diagram of FIG. 9, and the same steps are denoted by the same reference numerals. Hereinafter, the differences between the steps illustrated in each of FIG. 16A and FIG. 16B and the steps illustrated in FIG. 9 will be mainly described.

In the steps of FIG. 16A, what is transmitted from first vehicle 20 is a traveling position change notification instead of the first vehicle information illustrated in FIG. 10 and FIG. 11, which is different from the steps illustrate in the sequence diagram of FIG. 9. The traveling position change notification is, for example, a notification that is transmitted to security risk countermeasure server 10 when first vehicle 20 crosses a boundary between areas and indicates a new current traveling position. Note that this notification may be performed by transmitting only the entries of the vehicle ID and the traveling position, which are part of the vehicle information illustrated in FIG. 11. In security risk countermeasure server 10 which has received this notification, after the traveling position change notification is stored in storage 13 (step S30A), risk determination unit 14 executes steps S415, S416, and S425 in the steps illustrated in the flowchart of FIG. 13 (step S40A), and then executes the second stage process.

In the steps illustrated in FIG. 16B, what is transmitted from first vehicle 20 is a traveling state change notification instead of the first vehicle information illustrated in FIG. 10 and FIG. 11, which is different from the steps illustrated in the sequence diagram of FIG. 9. The traveling state change notification indicates, for example, a new current traveling speed range that is transmitted to security risk countermeasure server 10 when the traveling state of first vehicle 20 changes from a low speed traveling to a high speed traveling of a predetermined speed or higher. Note that this notification may be performed by transmitting only the entries of the vehicle ID and the traveling state, which are part of the vehicle information illustrated in FIG. 11. In security risk countermeasure server 10 which has received this notification, after the traveling state change notification is stored in storage 13 (step S30B), risk determination unit 14 executes steps S423 to S425 in the steps illustrated in the flowchart of FIG. 13 (Step S40B), and then executes the second stage process.

[2.2.4 Risk Control according to Risk Level (Function Restriction Cancellation)]

The example, in which the validated vehicle function is restricted according to the risk level, has been described above. However, in security risk countermeasure system 1 including security risk countermeasure server 10 according to the present embodiment, the restriction on the vehicle function may be cancelled based on the determination that the risk level has decreased to be lower than the first criterion. As a result, the driver of first vehicle 20 is capable of receiving again the benefit of the high-tech function involving information processing which was once restricted due to the increased risk level. The process of cancelling the restriction on the vehicle function will be described below.

FIG. 17 is a flowchart illustrating an example of steps for a risk control process executed by security risk countermeasure server 10 using the risk score included in the risk level management list. FIG. 17 is related to part of the second stage in the example of the steps illustrated in FIG. 5. These steps are executed, for example, when new first vehicle information is received from first vehicle 20 after the risk countermeasure command is output by the process whose example is illustrated in the flowchart of FIG. 15, and the risk level management list is regenerated (updated). The steps can be executed in the second and subsequent risk control loop in the flowchart of FIG. 5. Moreover, the steps may be executed when the traveling position change notification or the traveling state change notification is received from first vehicle 20, or when the risk point table is updated.

Risk determination unit 14 determines whether or not the risk score newly read from the risk level management list is lower than the first threshold value (step S700). When the risk score is lower than the first threshold value (Yes in step S700), risk determination unit 14 determines whether or not a function invalidation command is unissued (step S701). When the function invalidation command is unissued (Yes in step S701), risk determination unit 14 causes function restriction cancellation command generator 18 to generate a command for cancelling the restriction on the vehicle function (hereinafter, also referred to as a function restriction cancellation command). Function restriction cancellation command generator 18 generates a function restriction cancellation command (step S710). The generated function restriction cancellation command is output from command output unit 17 (step S720), and is transmitted to first vehicle 20. Steps S700 and S701 correspond to step S7 of the flowchart in FIG. 5.

When the risk score is higher than or equal to the first threshold value (No in step S700) or the function invalidation command has been issued (No in step S701), the process ends without changing the function restriction.

Note that in the above examples of the steps, when the vehicle function has been invalidated, the function restriction is not cancelled. This is a measure for more reliably protecting first vehicle 20 from a cyberattack in consideration that the vehicle function is invalidated when the risk level is significantly high. The invalidation of the vehicle function may be cancelled, for example, after safety is confirmed by the vehicle manufacturer or SOC of first vehicle 20.

Figure 18A:
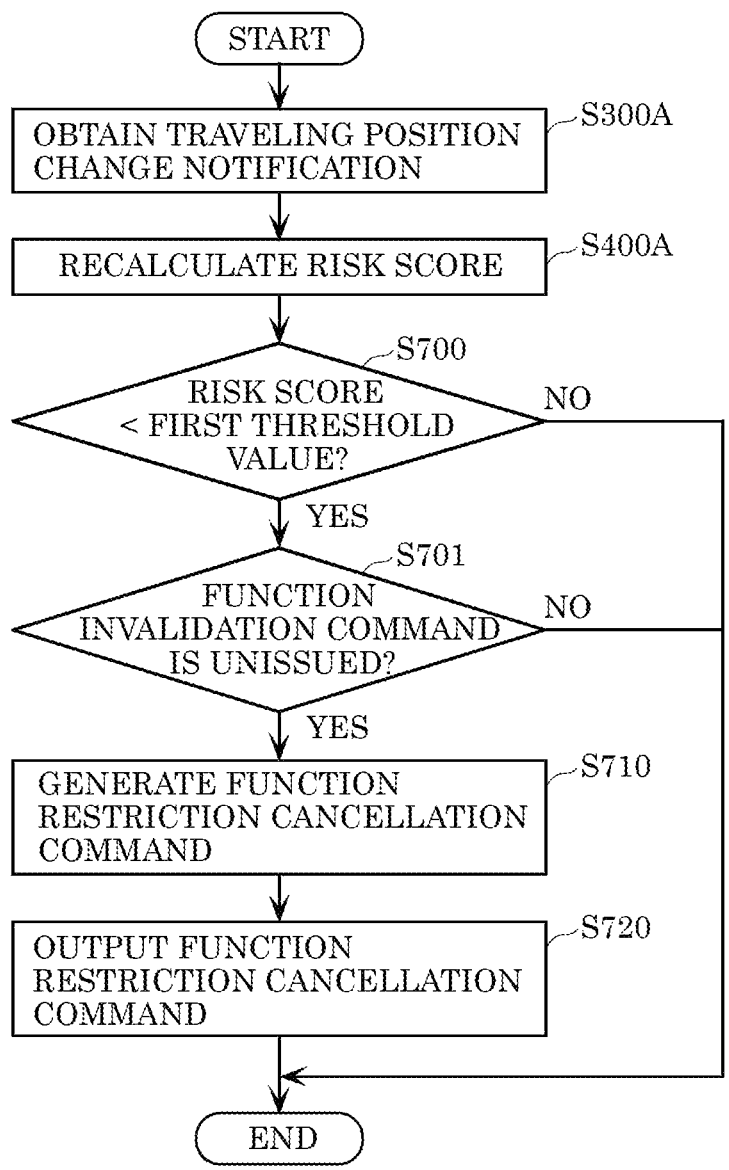
FIG. 18A is a flowchart illustrating an example of steps for a risk control process using the risk score included in the risk level management list.

Moreover, the process of cancelling the restriction on the vehicle function may be executed after the risk score is recalculated when the traveling position or the traveling state changes as described above. FIG. 18A is a flowchart illustrating an example of steps for the process of cancelling the restriction on the vehicle function executed after the recalculation of the risk score.

In the example, after the traveling position change notification is obtained by security risk countermeasure server 10 (step S300A) and is stored in storage 13, risk determination unit 14 recalculates the risk score related to the traveling position (corresponding to steps S415 and S416 in the steps illustrated in the flowchart of FIG. 13) (step S400A), and writes the recalculated risk score in the risk level management list. Risk determination unit 14 newly reads the recalculated risk score from the risk level management list. The subsequent steps are the same as the steps illustrated in FIG. 17.

Figure 18B:
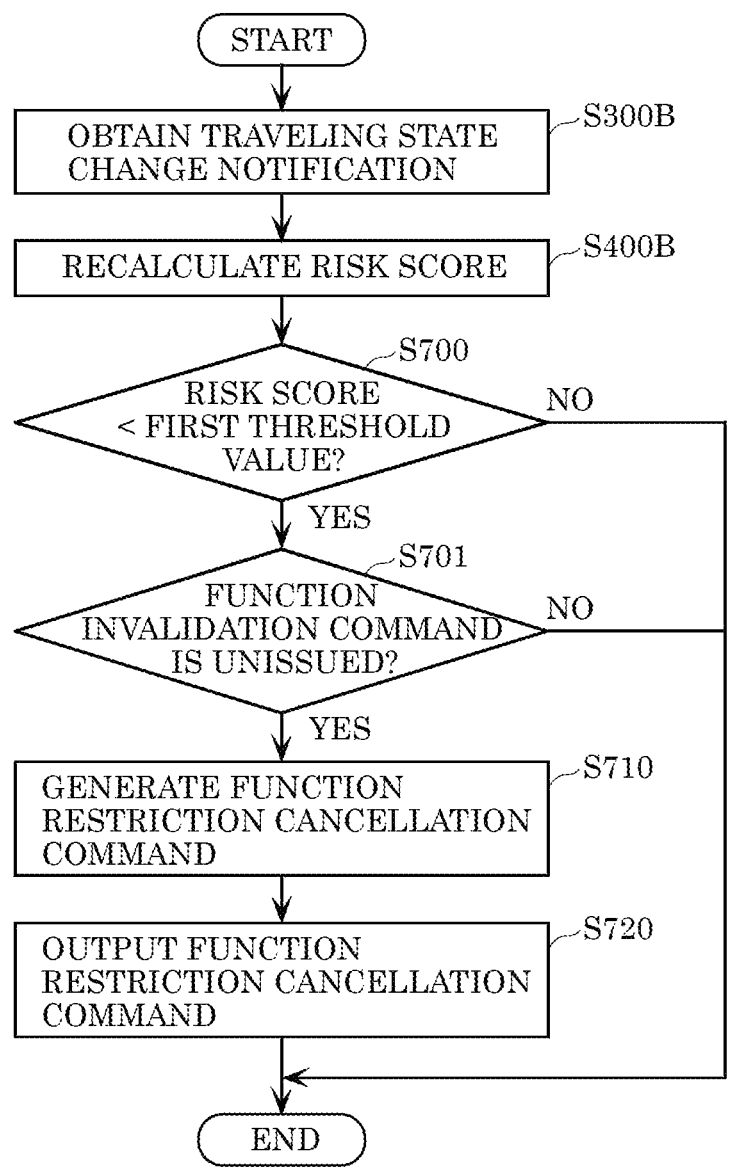
FIG. 18B is a flowchart illustrating an example of steps for a risk control process using the risk score included in the risk level management list.

Additionally, when the traveling state changes, the same steps as the steps performed when the traveling position changes may be executed (see FIG. 18B). The differences between the steps illustrated in FIG. 18B and the steps illustrated in FIG. 18A are that security risk countermeasure server 10 obtains a traveling state change notification (step S300B), and the step in which risk determination unit 14 recalculates the risk score related to the traveling state corresponds to steps S423 and S424 in the steps illustrated in the flowchart of FIG. 13.

Figure 18C:
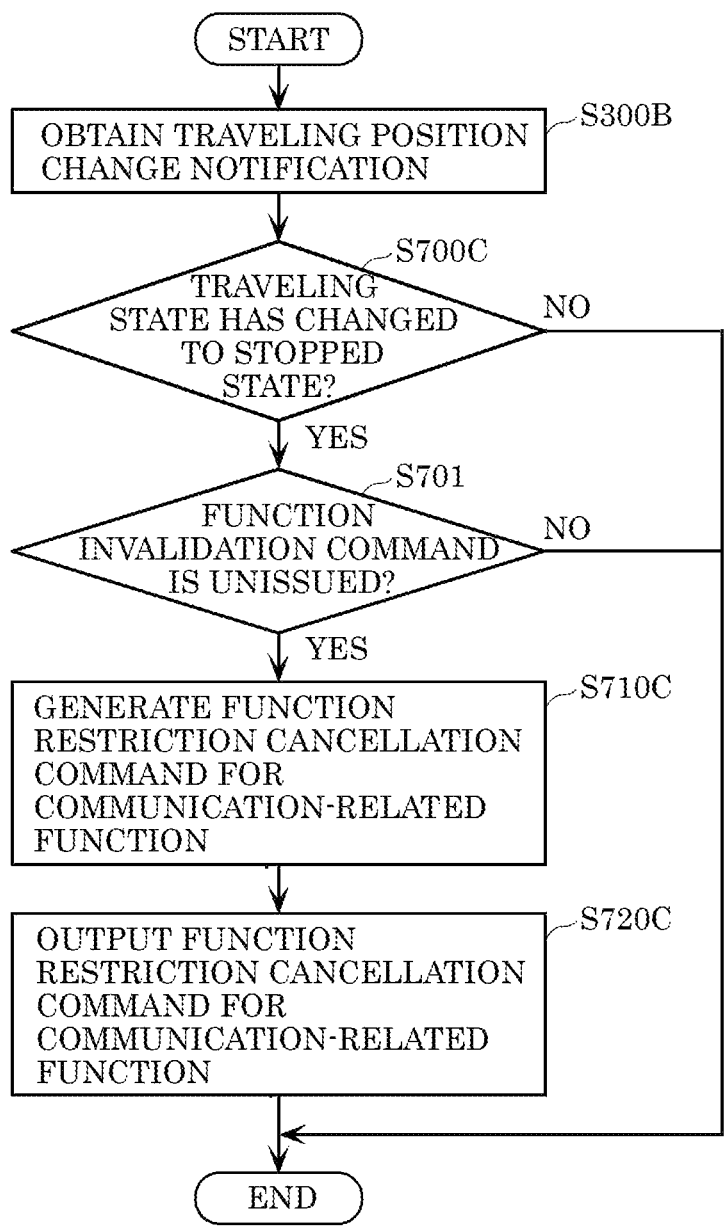
FIG. 18C is a flowchart illustrating an example of steps for a risk control process using the risk score included in the risk level management list.

Regarding the communication-related functions of the vehicle, when the traveling state changes to a stopped state, the function restriction is rapidly cancelled, so that such advantages can be obtained that first vehicle 20 is capable of rapidly notifying the SOC or the like, or obtaining security patches from the SOC or the like. In addition, since the possibility that first vehicle 20 will shift from the stopped state to a risky operation due to the influence of a cyberattack is low, the risk of cancelling the function restriction on the communication related functions is small. FIG. 18C illustrates an example of steps, which is based on the above idea, for the process of cancelling the function restriction on the communication-related function when the traveling state changes to a stopped state.

In this example, after a traveling state change notification is obtained in security risk countermeasure server 10 (step S300B), and is stored in storage 13, risk determination unit 14 determines (step S700C) whether or not the traveling state has changed to a stopped state instead of recalculating the risk score as illustrated in FIG. 18A. When the traveling state has changed to a stopped state (Yes in step S700C), risk determination unit 14 determines whether or not a function invalidation command is unissued (step S701). When the function invalidation command is unissued (Yes in step S701), risk determination unit 14 causes function restriction cancellation command generator 18 to generate a function restriction cancellation command for the communication-related functions. Function restriction cancellation command generator 18 generates a function restriction cancellation command for the communication-related functions (step S710C). The generated function restriction cancellation command for the communication-related functions is output from command output unit 17 (step S720C), and is transmitted to first vehicle 20.

When the traveling state has changed to a state other than a stopped state (No in step S700C) or the function invalidation command has been issued (No in step S701), the process ends without changing the function restriction on the communication-related functions.

In security risk countermeasure system 1, the second stage which has been described is repeatedly executed (risk control loop in FIG. 5). As a result, it is possible to continuously apply the security risk countermeasures suitable for the risk level of the vehicle function which is changeable according to the vehicle state to first vehicle 20 for which the security risk countermeasures are to be applied.

Embodiment 2

In a security risk countermeasure system including an information processing device according to Embodiment 2, incident information of cyberattacks collected from a large number of vehicles is used for determining the risk level of each of the vehicle functions of the first vehicle for which security risk countermeasures are currently executed. Such a feature is the same as Embodiment 1.

On the other hand, Embodiment 2 is different from Embodiment 1 in that, in addition to the incident information, vehicle information of the vehicle other than the first vehicle (hereinafter, also referred to as a second vehicle) is used for determining the risk level. Hereinafter, the present embodiment will be described focusing on the differences from Embodiment 1. Note that the description of the features which are the same as those in Embodiment 1 will be simplified or omitted.

The second vehicle here is, for example, a vehicle which can communicate with the first vehicle. More specifically, for example, the second vehicle is a vehicle which is in the vicinity of the first vehicle and which is capable of directly communicating with the first vehicle. Moreover, for example, the second vehicle is a vehicle which can establish communication with the first vehicle by being mediated by a relay station, a roadside machine, another vehicle or the like to which each of the first vehicle and the second vehicle is connected. When the risk level of the second vehicle, which is the communication partner, against cyberattacks is high, the risk level of the first vehicle which exchanges information with the second vehicle also increases. As another example, the second vehicle may be a vehicle which includes an ECU which is the same as the EUC of the first vehicle and which has a risk point higher than or equal to a predetermined level (hereinafter, also referred to as risk ECU), a vehicle of the same vehicle type as the first vehicle, or a vehicle which has vehicle functions which are the same as those of the first vehicle. When the risk level of such a second vehicle against cyberattacks is high, the first vehicle is also likely to have the same vulnerability, and thus, the risk level of the first vehicle against cyberattacks is also high. As another example, the second vehicle may be a vehicle traveling near the first vehicle, regardless of whether or not there is a communication with the first vehicle. When the second vehicle is under a regional cyberattack, the first vehicle traveling nearby may also be exposed to the cyberattack, and thus, the risk level of the first vehicle is high. Accordingly, restricting the vehicle functions of the first vehicle according to the risk level of the vehicle other than the first vehicle in such a manner is also effective as a security risk countermeasure for the first vehicle.

[1. Configuration]

Figure 19:
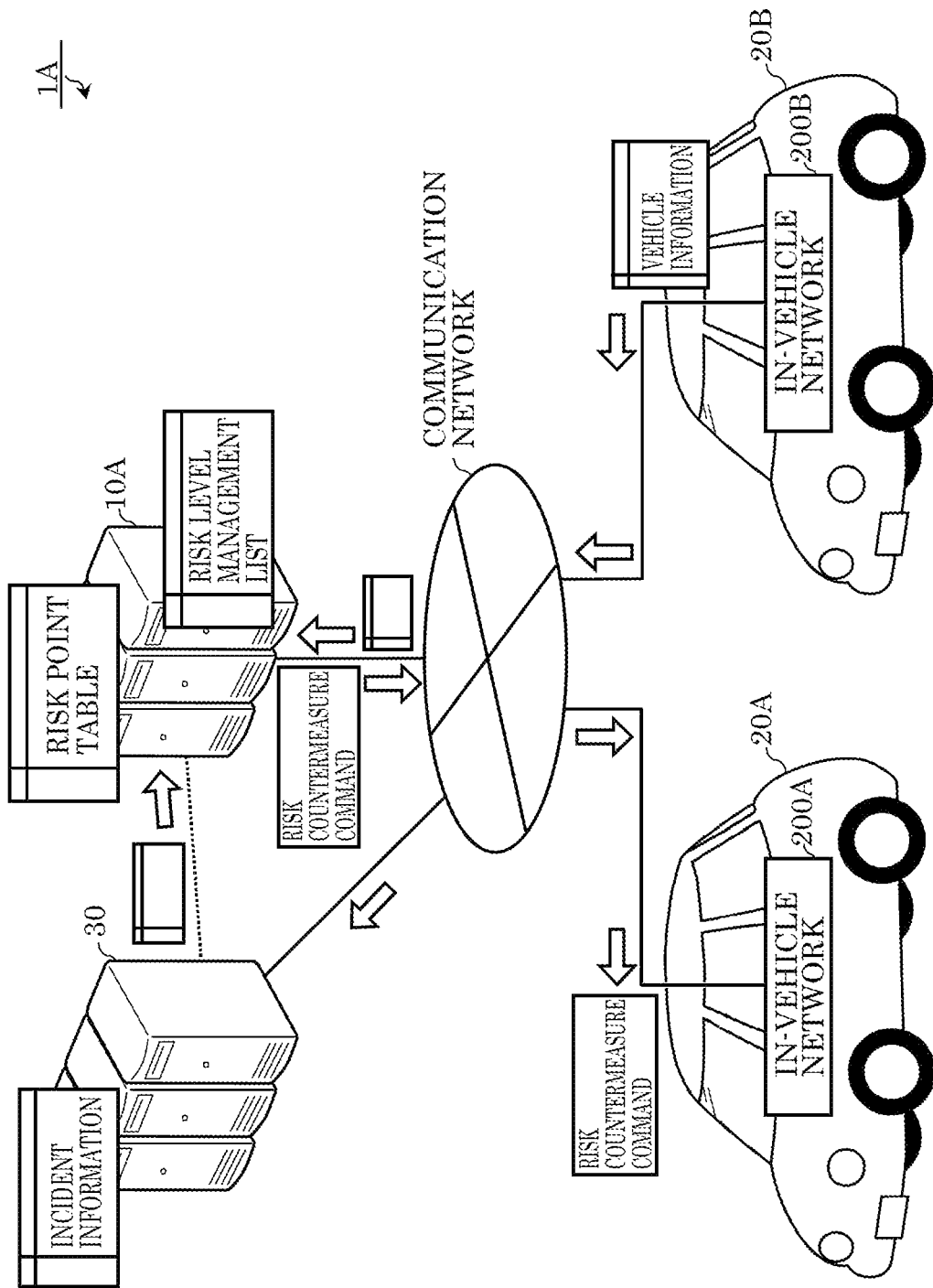
FIG. 19 illustrates an outline of a configuration example of a security risk countermeasure system including an information processing device according to Embodiment 2.

FIG. 19 illustrates an outline of a configuration example of security risk countermeasure system 1A including an information processing device according to the present embodiment.

In the configuration example illustrated in FIG. 19, security risk countermeasure server 10A, vehicle 20A as a first vehicle, and incident information collection server 30 are interconnected via a communication network, such as the Internet, so that information can be exchanged between them. In addition, second vehicle 20B, which is different from first vehicle 20A, is also connected to security risk countermeasure server 10A and incident information collection server 30 via a communication network, such as the Internet, so that information can be exchanged between them.

Incident information collection server 30 may have the same configuration as that of Embodiment 1, and thus, detailed description thereof will be omitted. Moreover, the structure of the incident information provided from incident information collection server 30 to security risk countermeasure server 10A may be the same as that of Embodiment 1, and thus, detailed description thereof will be omitted.

In addition, regarding first vehicle 20A and second vehicle 20B, the configurations of in-vehicle networks 200A and 200B respectively provided may be the same as the configuration of in-vehicle network 200 of first vehicle 20 in Embodiment 1 described with reference to FIG. 3. Hence, the detailed description thereof will be omitted.

The basic configuration of security risk countermeasure server 10A is the same as that of security risk countermeasure server 10 in Embodiment 1. Security risk countermeasure server 10A also includes one or more information processing devices including a processor and a memory, and is an example of the information processing device according to the present embodiment. As described above, security risk countermeasure server 10A and security risk countermeasure server 10 are different in the second stage process in which the incident information obtained from incident information collection server 30 and the information about the state of the second vehicle obtained from second vehicle 20B are used to determine the risk level related to the cyberattack on each of the vehicle function of first vehicle 20A. It should be noted that this process can be executed together with the process in which the first vehicle information obtained from vehicle 20 for which the security risk countermeasures are to be executed in Embodiment 1 is used. Each structural element which executes the process may be the same as the structural elements of security risk countermeasure server 10, and thus, detailed description thereof will be omitted.

[2. Operation]

Next, an operation of the security risk countermeasure process executed by security risk countermeasure system 1A will be described focusing on the differences from Embodiment 1.

Figure 20:
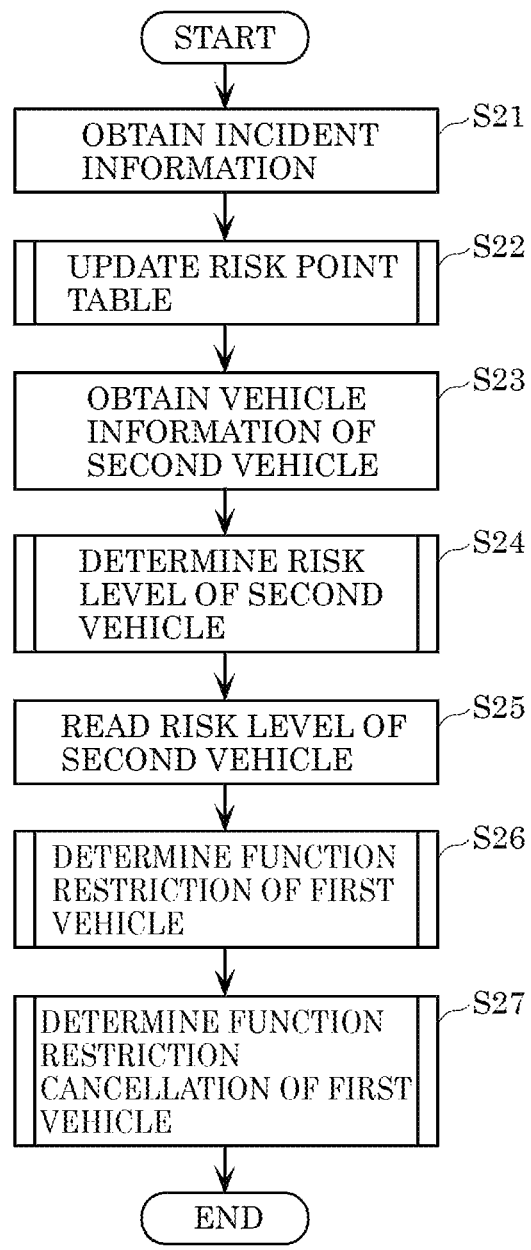
FIG. 20 is a flowchart illustrating an example of steps for a security risk countermeasure process executed by a security risk countermeasure server realized by the information processing device according to Embodiment 2.

FIG. 20 is a flowchart illustrating an example of steps for the process executed by security risk countermeasure server 10A.

The steps from obtaining the incident information from incident information collection server 30 (step S21) to storing the incident information, and updating the risk point table by risk point manager 15 (step S22) based on the obtained incident information may be the same as those in Embodiment 1 illustrated in FIG. 5. Hence, the description thereof will be omitted. The following steps will be described with reference to the sequence diagram in FIG. 21 corresponding to the sequence diagram in FIG. 9 for comparison with Embodiment 1. With reference to the sequence diagram in FIG. 21, second vehicle 20B, which is a vehicle other than first vehicle 20A for which the security risk countermeasures are to be executed, is involved in the security risk countermeasure process of first vehicle 20A.

Next, in security risk countermeasure system 1A, the information about the state of second vehicle 20B (hereinafter, also referred to as second vehicle information) transmitted from second vehicle 20B is stored in storage 13 by vehicle information obtaining unit 12 (Step S23 in FIG. 20, Steps S22030 and S230 in FIG. 21).

Figure 21:
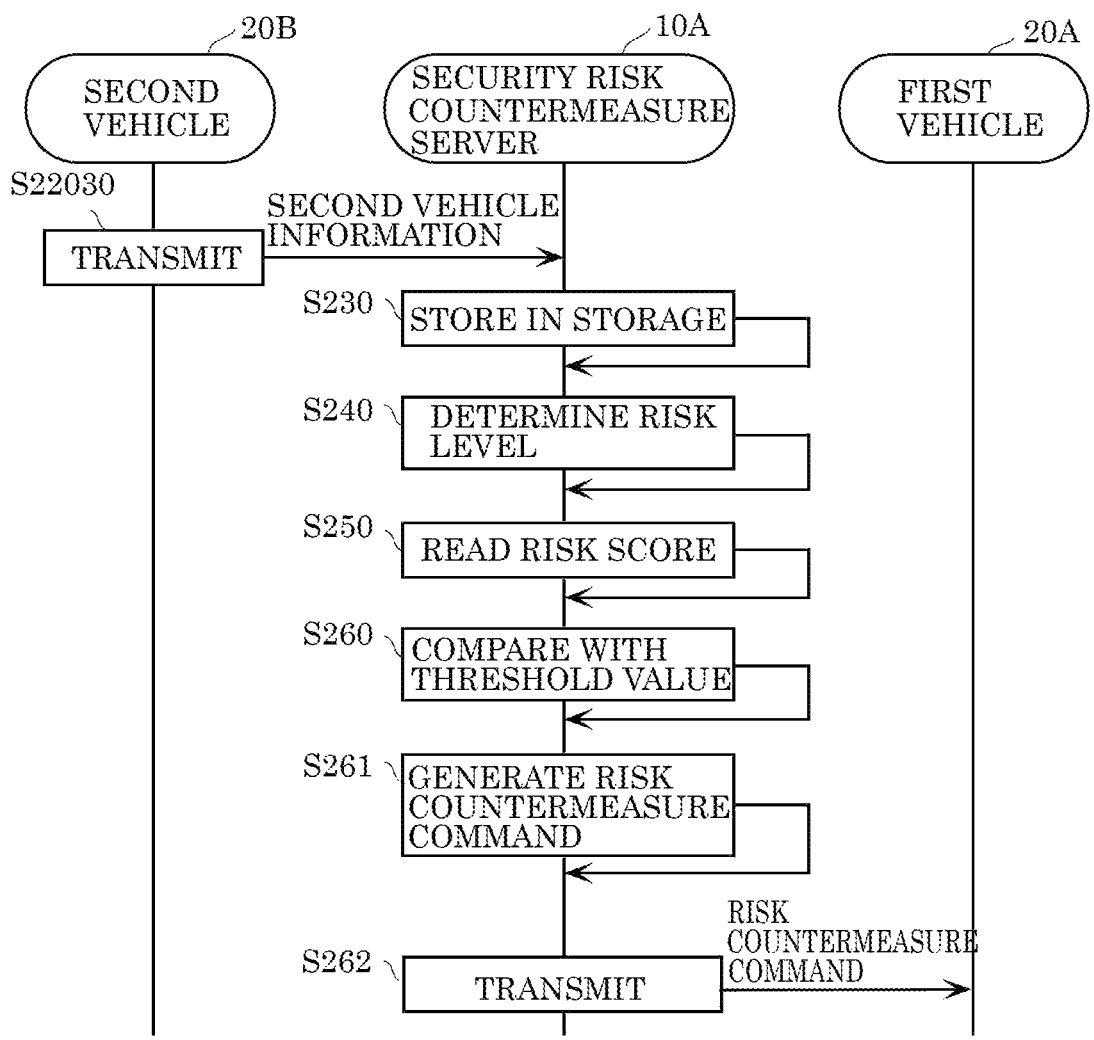
FIG. 21 is a sequence diagram illustrating steps including coordination between a second vehicle and a security risk countermeasure server and coordination between a first vehicle and the security risk countermeasure server in the security risk countermeasure process.

Next, in security risk countermeasure system 1A, risk determination unit 14 determines the risk level of the second vehicle using the risk point tables and the second vehicle information, and generates a risk level management list (including the case of updating the list) (Step S24 in FIG. 20 and step S240 in FIG. 21). The steps for the process of determining the risk level of the second vehicle and generating the risk level management list may be the same as the steps for first vehicle 20 described in Embodiment 1 with reference to FIG. 10 to FIG. 14F. Hence, the description thereof is omitted here.

Risk determination unit 14, which has written the risk score of second vehicle 20B into the risk level management list, then reads the risk score (step S25 in FIG. 20, step S250 in FIG. 21) for the risk control process of first vehicle 20A. In other words, risk determination unit 14 uses the read risk score to determine whether or not a restriction (including the case of invalidation) on a validated vehicle function is necessary (step S26 in FIG. 20).

Figure 22:
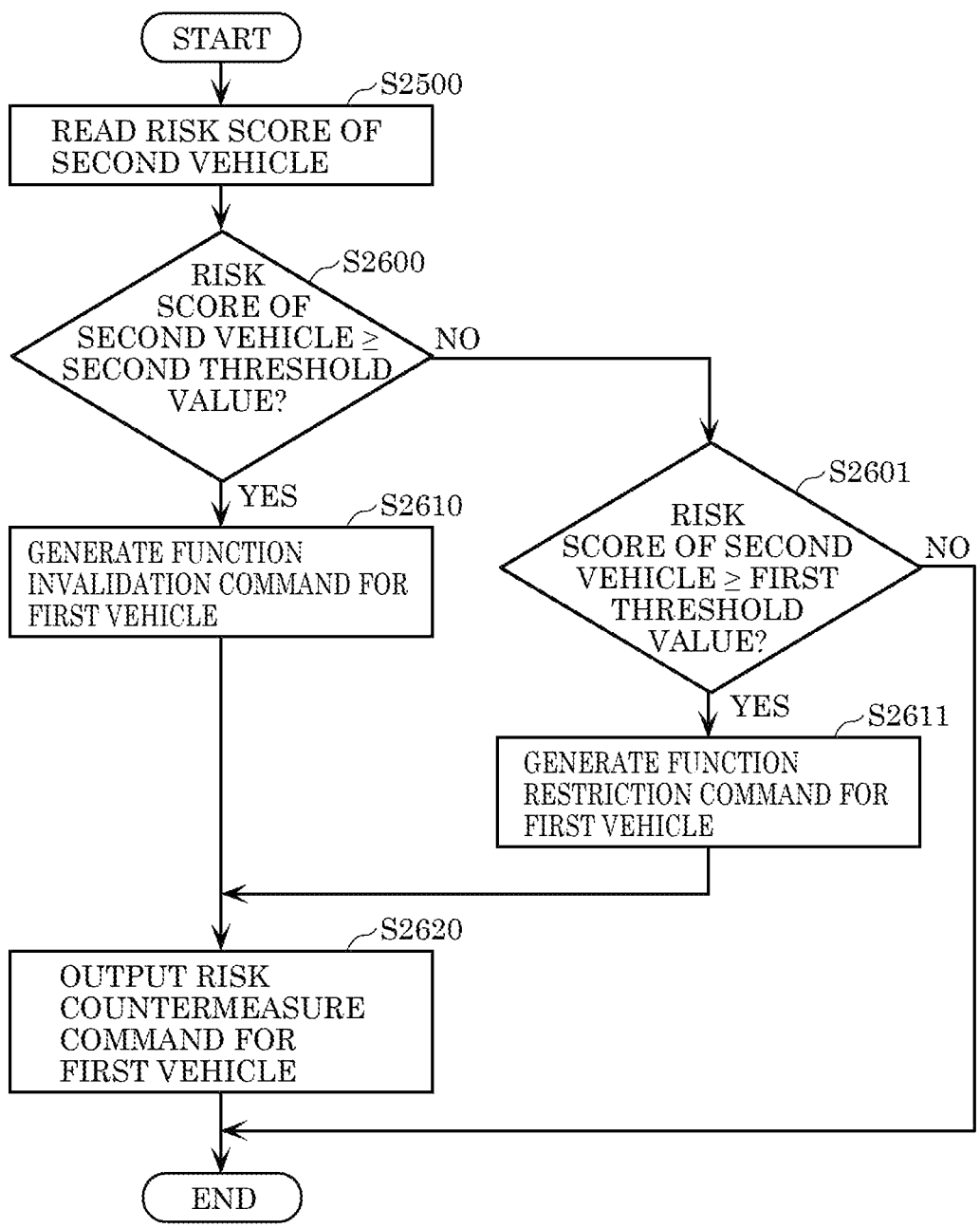
FIG. 22 is a flowchart illustrating an example of steps for a risk control process of the first vehicle using a risk score of the second vehicle.

FIG. 22 is a flowchart illustrating an example of steps executed in security risk countermeasure server 10A for a risk control process of first vehicle 20A using the risk score of second vehicle 20B.

The basic flow of the risk control process of first vehicle 20A in the present embodiment may be the same as the risk control process in Embodiment 1 described with reference to FIG. 15. The first threshold value, the second threshold value, the function invalidation command, the function restriction command, and the risk countermeasure command in the drawing may be the same as those in Embodiment 1, and thus the description thereof is omitted.

When risk determination unit 14 reads the risk score of second vehicle 20B from the risk level management list (step S2500), risk determination unit 14 determines whether the risk score is higher than or equal to the second threshold value (step S2600). When the risk score of second vehicle 20B is lower than the second threshold value (No in step S2600), risk determination unit 14 further determines whether the risk score is higher than or equal to the first threshold value (step S2601). Steps S2600 and S2601 correspond to step S26 in the flowchart of FIG. 20 and step S260 in the sequence diagram of FIG. 21.

When the risk score of second vehicle 20B is lower than the first threshold value (No in step S2601), the vehicle function of first vehicle 20A is neither restricted nor invalidated, and the risk control process ends.

When the risk score of second vehicle 20B is higher than or equal to the second threshold value (Yes in step S2600), risk determination unit 14 causes risk countermeasure command generator 16 to generate a function invalidation command for the vehicle functions of first vehicle 20A. Risk countermeasure command generator 16 generates a function invalidation command in accordance with the details of the "invalidation" field of the risk control target vehicle function in the risk level management list (FIG. 12) (step S2610). The generated function invalidation command is output from command output unit 17 (step S2620), and is transmitted to first vehicle 20A.

When the risk score of second vehicle 20B is lower than the second threshold value and higher than or equal to the first threshold value (Yes in step S2601), risk determination unit 14 causes risk countermeasure command generator 16 to generate a function restriction command. Risk countermeasure command generator 16 generates a function restriction command according to the details of the "restriction" field of the risk control target vehicle function in the risk level management list (step S2611). The generated function restriction command is output from command output unit 17 (step S2620), and is transmitted to first vehicle 20A. Steps S2610 and S2611 correspond to step S261 in the sequence diagram of FIG. 21. Moreover, step S2620 corresponds to step S262 in the sequence diagram of FIG. 21.

In such a manner, the vehicle function of first vehicle 20A is restricted according to the risk score of second vehicle 20B, that is, the risk level of second vehicle 20B by the steps in the example of the flowchart of FIG. 15. Accordingly, for example, even when second vehicle 20B is capable of communicating with first vehicle 20A and the risk level of second vehicle 20B is high due to the vulnerability to cyberattacks, it is possible to prevent the incident which occurs in second vehicle 20B from affecting the vehicle functions of first vehicle 20A via communication.

The selection of second vehicle 20B for first vehicle 20A can be performed at any time before step S26 in the flowchart of FIG. 20, for example, by risk determination unit 14 or risk countermeasure command generator 16. For example, the steps before step S24 are executed for all vehicles to be monitored by security risk countermeasure system 1A. Then, risk determination unit 14 may use information about the traveling position included in the vehicle information of first vehicle 20A which is one of the monitored vehicles, and information about the traveling position included in the vehicle information of a monitored vehicle other than first vehicle 20A to select, as second vehicle 20B, the vehicle positioned in a predetermined proximity to (within a predetermined distance from) first vehicle 20A, and execute step S24 and subsequent steps. Alternatively, the vehicle which is positioned in a predetermined proximity to (within a predetermined distance from) first vehicle 20A and which has a function of communicating with first vehicle 20A may be selected as second vehicle 20B. Alternatively, with reference to the device list of the vehicle information (FIG. 10), the vehicle including a device which is the same as first vehicle 20A may be selected as second vehicle 20B. Alternatively, it may be that after the security risk countermeasure process in Embodiment 1 illustrated in FIG. 5 is executed for all the vehicles to be monitored by security risk countermeasure system 1A, the vehicle to which some kind of function restriction is applied is first selected as second vehicle 20B, and first vehicle 20A may be selected based on the traveling position, the installed functions, the devices, or the like as described above.

The first threshold value and the second threshold value which are compared with the risk score of second vehicle 20B may be the same as the first threshold value and the second threshold value used for first vehicle 20 in Embodiment 1, or may be a criterion indicating a risk level different from such threshold values. Relative to the criterion (third criterion) indicated by the first threshold value and the criterion (fourth criterion) indicated by the second threshold value used in second vehicle 20B, the fourth criterion may be higher than the third criterion.

Moreover, the restriction applied to first vehicle 20A when the risk score of second vehicle 20B is lower than the second threshold value and higher than or equal to the first threshold value may be different from the restriction applied to first vehicle 20A when the risk score of first vehicle 20A is lower than the second threshold value and higher than or equal to the first threshold value. For example, these restrictions may be defined in two separated rows of "restrict" field in the risk level management list.

The vehicle functions which are restricted or invalidated in first vehicle 20A are the vehicle functions of first vehicle 20A which correspond to the vehicle functions of second vehicle 20B with risk scores exceeding the first threshold value or the second threshold value. The vehicle function of first vehicle 20A corresponding to the vehicle function of second vehicle 20B here is, for example, the same vehicle function as the vehicle function of second vehicle 20B with a risk score exceeding each threshold value. Moreover, other vehicle functions provided by the ECU which provides vehicle functions which are restricted or invalidated in first vehicle 20A may be included in the corresponding vehicle functions. As another example, the corresponding vehicle function may be the vehicle function provided by the ECU whose manufacturer is the same or provided by the same type of ECU as the ECU which provides a vehicle function with a risk score exceeding the first threshold value or the second threshold value in second vehicle 20B, even though the function provided by first vehicle 20A is different from the vehicle function of second vehicle 20B. Such a corresponding vehicle function is understood by referring to the device list.

Figure 23:
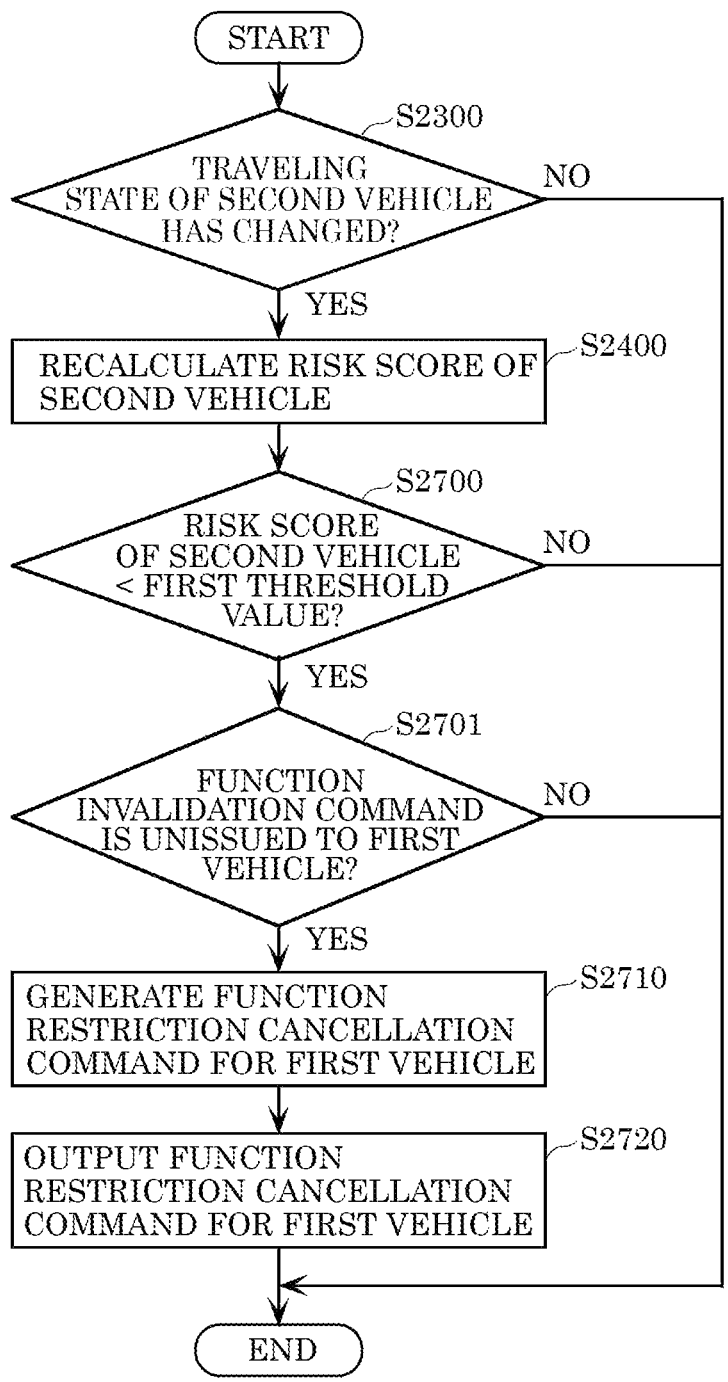
FIG. 23 is a flowchart illustrating an example of steps for the risk control process of the first vehicle using the risk score of the second vehicle.

In addition, as the risk control of first vehicle 20A according to the risk level of second vehicle 20B in the present embodiment, cancellation of the function restriction may be executed in a similar manner to Embodiment 1. FIG. 23 is a flowchart illustrating an example of steps for the process of cancelling the restriction on the vehicle function executed after the risk score of second vehicle 20B is recalculated.

In the example, first, risk determination unit 14 determines whether or not the traveling state of second vehicle 20B has changed (step S2300). When the traveling state of second vehicle 20B has changed (Yes in step S2300), risk determination unit 14 recalculates the risk score related to the traveling state of second vehicle 20B (corresponding to steps S423 and S424 in the steps in the flowchart of FIG. 13) (step S2400) and writes the recalculated risk score in the risk level management list. Next, risk determination unit 14 newly reads the recalculated risk score of second vehicle 20B from the risk level management list. Subsequently, the steps which are the same as the steps in FIG. 17 are executed using the recalculated risk score. Steps S2700, S2701, S2710 and S2720 correspond to steps S700, S701, S710 and S720 in Embodiment 1 illustrated in FIG. 17. The determination as to the issuance of the function invalidation command is made in step S2701 for the same reason that the function restriction is not cancelled when the vehicle function is invalidated in Embodiment 1.

Figure 24A:
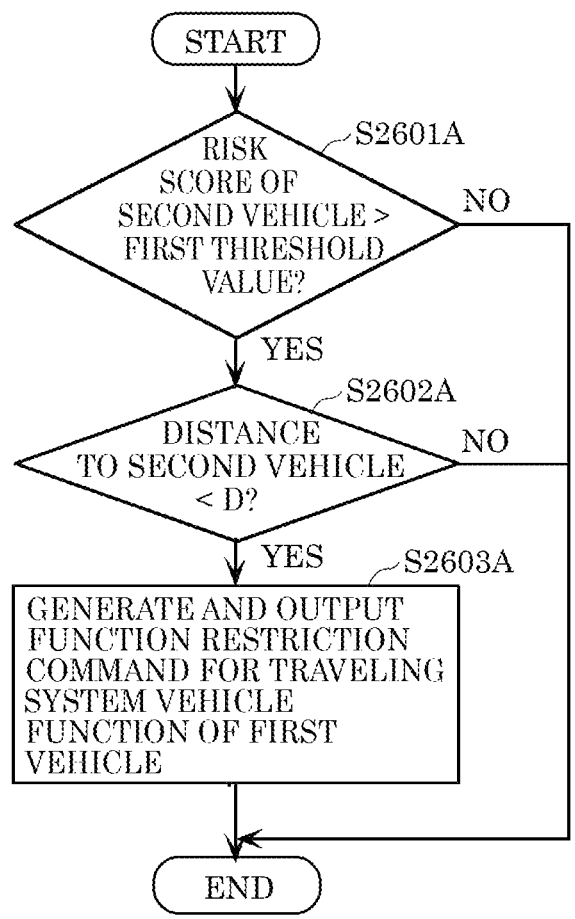
FIG. 24A is a flowchart illustrating an example of steps for a risk control process of the first vehicle using a distance between the first vehicle and the second vehicle.
Figure 24B:
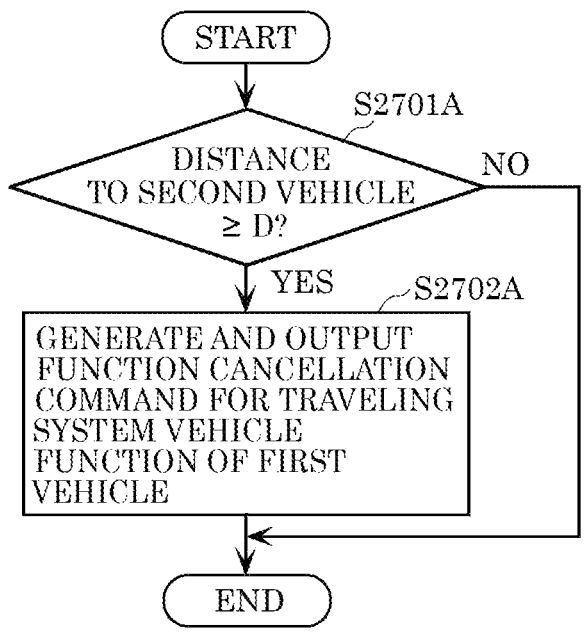
FIG. 24B is a flowchart illustrating an example of steps for the risk control process of the first vehicle using the distance between the first vehicle and the second vehicle.

Moreover, in the present embodiment, the possibility that the vehicle function of first vehicle 20A is affected by the incident which occurs in second vehicle 20B changes depending on whether or not communication with second vehicle 20B can be established. In other words, when the communication cannot be established, there is no possibility that the incident which occurs in second vehicle 20B affects the vehicle function of first vehicle 20A via communication. Accordingly, whether to restrict the vehicle function of first vehicle 20A may be determined, for example, depending on whether or not the distance between first vehicle 20A and second vehicle 20B with a high risk level is a distance which allows communication to be established between vehicles. FIG. 24A is a flowchart illustrating an example of steps for the process of restricting the vehicle function of first vehicle 20A in this aspect. FIG. 24B is a flowchart illustrating an example of steps for the process of cancelling restriction on the vehicle function of first vehicle 20A after the function restriction command for the vehicle function of first vehicle 20A is output in the example of the steps illustrated in FIG. 24A.

In the example of the steps illustrated in FIG. 24A, risk determination unit 14 determines whether or not the risk score of second vehicle 20B read from the risk level management list is higher than or equal to the first threshold value (step S2601A). When the risk score of second vehicle 20B is higher than or equal to the first threshold value (Yes in step S2601A), risk determination unit 14 further determines whether or not the distance between first vehicle 20A and second vehicle 20B is less than predetermined reference distance d. Reference distance d is determined, for example, based on the upper limit of the distance which allows communication in accordance with the standard with which the communication which can be established between first vehicle 20A and second vehicle 20B complies. When the distance between first vehicle 20A and second vehicle 20B is less than reference distance d (Yes in step S2602A), risk determination unit 14, in this example, causes risk countermeasure command generator 16 to generate a function restriction command for the traveling-related functions among the vehicle functions of first vehicle 20A. The function restriction command for the traveling-related functions is then output from command output unit 17 (step S2603A), and is transmitted to first vehicle 20A.

When the risk score of second vehicle 20B is lower than the first threshold value (No in step S2601A) or when the distance between first vehicle 20A and second vehicle 20B is greater than or equal to reference distance d, a function restriction command for the vehicle functions of first vehicle 20A is not generated. In any of these cases, there is no possibility that the incident which occurs in second vehicle 20B affects the vehicle functions of first vehicle 20A via communication. Hence, it is not necessary to execute, in first vehicle 20A, security countermeasures according to the risk level of second vehicle 20B.

In the above example of the steps, the restriction is applied to the traveling-related functions because the traveling-related functions can be mostly affected by the incident while traveling in relatively proximity to second vehicle 20B and can cause a most serious situation.

In the example of the steps in FIG. 24B executed when step S2702A is executed, risk determination unit 14 determines whether or not the distance between first vehicle 20A and second vehicle 20B is greater than or equal to predetermined reference distance d (step S2701A). When the distance between first vehicle 20A and second vehicle 20B is greater than or equal to predetermined reference distance d (Yes in step S2701A), even when an incident occurs in second vehicle 20B, there is no possibility that the incident affects the vehicle functions of first vehicle 20A via communication. Hence, a function restriction cancellation command for the traveling-related functions among the vehicle functions of first vehicle 20A is generated and output (step S2702A). While the distance between first vehicle 20A and second vehicle 20B is less than predetermined reference distance d (No in step S2701A), the function restriction cancellation command is not output. In other words, the function restriction for the traveling-related functions in first vehicle 20A is maintained.

Figure 25:
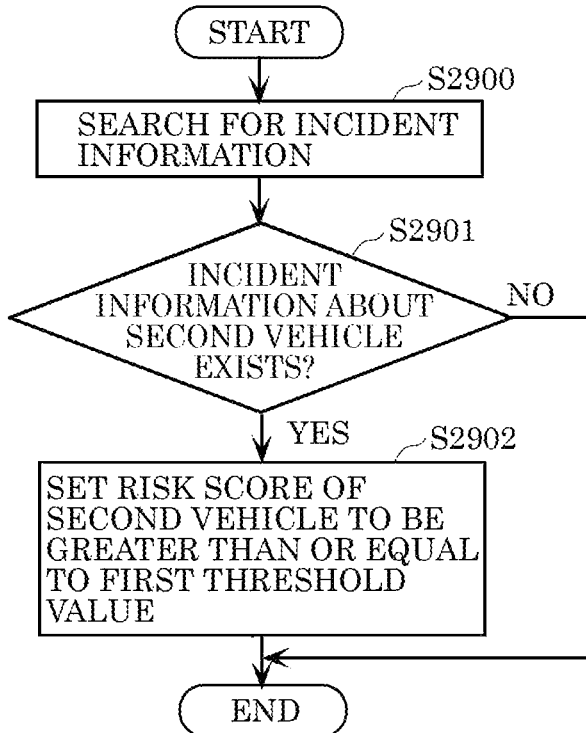
FIG. 25 is a flowchart illustrating an example of steps for a security countermeasure process according to an incident history of the second vehicle.

Moreover, in the case where the information which can identify the vehicle in which the incident has occurred is included in the incident information, the risk score of second vehicle 20B may be increased when second vehicle 20B has an incident history. In a vehicle with a record of cyberattack incidents, some kind of vulnerabilities which allowed the attack, or the influence of the attack may remain. Hence, it is appropriate to be cautious and take preventative measures for vehicles which can communicate with such a vehicle. By setting the risk score of such second vehicle 20B to be higher than or equal to the first threshold value, the function restriction on the vehicle function is applied to first vehicle 20A. As a result, even when an incident occurs in second vehicle 20B, it is possible to reduce the possibility that the incident will affect the vehicle functions of first vehicle 20A via communication. FIG. 25 is a flowchart illustrating an example of steps for a security countermeasure process according to an incident history of the second vehicle.

In the example of the steps illustrated in FIG. 25, risk determination unit 14 searches incident information stored in storage 2113 for a record of incident information related to second vehicle 20B (step S2900). When the record of the incident information related to second vehicle 20B is not found (No in step S2901), the risk score of second vehicle 20B does not change. When the record of the incident information related to second vehicle 20B is found (Yes in step S2901), the risk score of second vehicle 20B is set to be higher than or equal to the first threshold value (step S2902). In this case, the risk score set to be higher than or equal to the first threshold value may be, for example, a risk score for the vehicle function according to the details of the found incident information record. As a specific example, for example, if what occurred in second vehicle 20B is an incident in which the automated driving function is affected, the risk score of the automated driving function may be set to be higher than or equal to the first threshold value. In addition, in the cyberattack which caused such an incident, the possibility that the same functional system will also be affected is higher than other functional systems. Hence, the risk score of the same functional system as the automated driving function, that is, the risk scores of the driving support function and traveling control function which belong to the traveling system (see the risk level management list in FIG. 12) may also be set to be higher than or equal to the first threshold value.

(Modifications, etc.)

Although the information processing device forming the security risk countermeasure server included in the security risk countermeasure system according to one or more aspects has been described above based on the embodiments, the present disclosure is not limited to such embodiments. Various modifications of each embodiment as well as an embodiment resulting from combinations of the structural elements of different exemplary embodiments that may be conceived by those skilled in the art may be included within the scope of one or more aspects as long as they do not depart from the essence of the present disclosure. Examples of such modifications will be described below.

Figure 26:
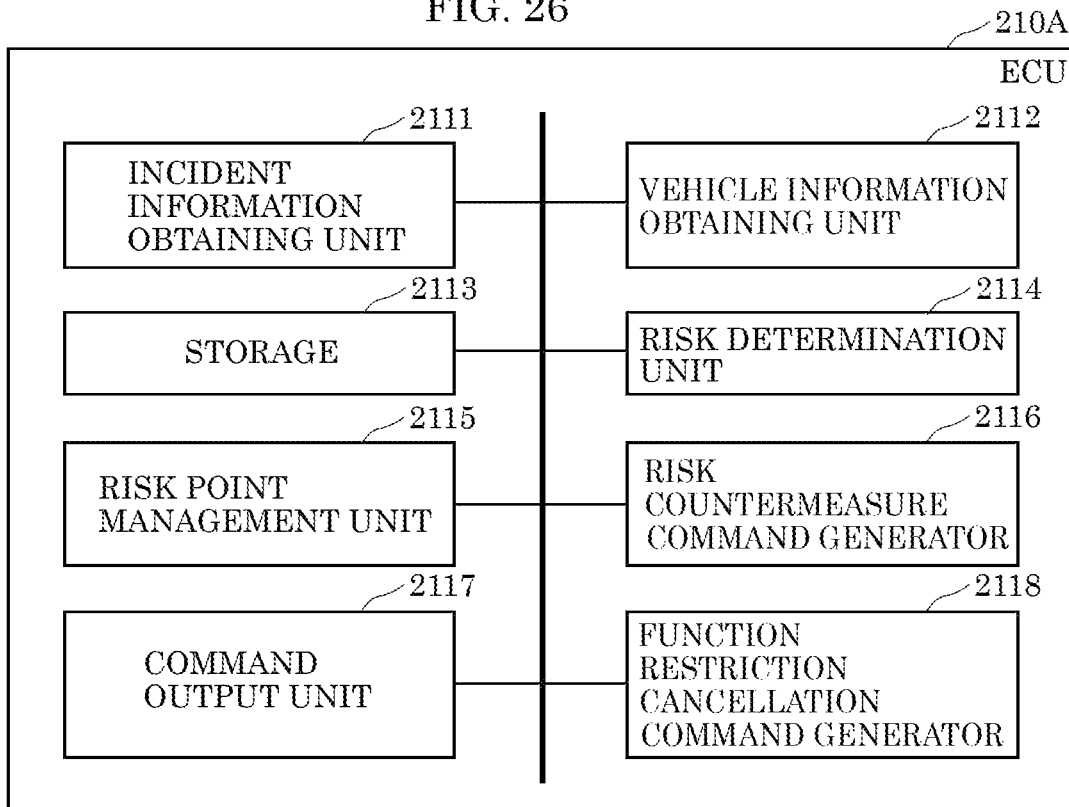
FIG. 26 illustrates a configuration example of an in-vehicle information processing device which executes a security risk countermeasure according to an embodiment.

(1) Although the information processing device illustrated for the description of each of the above embodiments is a server, at least part of the structural elements of the information processing device may be an in-vehicle information processing device, such as one or more ECUs. For example, among the ECUs illustrated in FIG. 3, ECU 210A may include the same functional configuration as security risk countermeasure server 10 or 10A. FIG. 26 is a block diagram of a functional configuration example of such ECU 210A. Vehicle information obtaining unit 2112 in FIG. 26 obtains the vehicle information of first vehicle 20 through a communication on the in-vehicle network, but does not receive the vehicle information via an external communication network. Moreover, the function restriction command and the function restriction cancellation command output from command output unit 2117 are directly transmitted to the in-vehicle network without going through the external communication network.

As an example in which an in-vehicle information processing device includes part of the functions of security risk countermeasure server 10 or 10A, steps up to updating of the risk point based on the incident information by the risk point manager, that is, the steps up to step S2 in the flowchart of FIG. 5 may be executed by the security risk countermeasure server, and the risk point table may be provided to the in-vehicle information processing device via the communication network. In this case, the in-vehicle information processing device executes step S4 and subsequent steps using the provided latest risk point table and the vehicle information obtained from another in-vehicle information processing device.

For example, it may be that generation (updating) of the risk level management list in step S4 in the flowchart of FIG. 5 is executed by the security risk countermeasure server, and the risk level management list is provided to the in-vehicle information processing device via the communication network. In this case, the in-vehicle information processing device executes step S5 and subsequent steps using the provided latest risk level management list. In addition, it may be that the risk point table is also provided from the security risk countermeasure server to the in-vehicle information processing device, and the in-vehicle information processing device performs a relatively small-scale update of the risk level related to the traveling position or the traveling state and performs the subsequent function restriction determination or the like. In this case, for example, the vehicle information of the first vehicle may be provided to the security risk countermeasure server by daily processing at midnight of each day or the like. The security risk countermeasure server updates the risk point table based on the incident information and fully updates the risk level management list of the first vehicle as a daily processing at night. By the early morning, the latest risk point table and risk level management list are transmitted to the first vehicle from the security risk countermeasure server. The in-vehicle information processing device of the first vehicle executes small-scale updating of the risk level and determination of function restriction from early morning to late at night. The vehicle information of the first vehicle may be provided to the security risk countermeasure server or the latest risk point table and risk level management list may be provided from the security risk countermeasure server to the first vehicle in response to a request from the driver of the first vehicle, instead of by the periodical processing such as daily processing.

(2) The aspect of the function restriction is not limited to the above description regarding the function restriction given with reference to the risk level management list in FIG. 12 and FIG. 15, etc. For example, a multi-stage restriction may be determined by using more criteria. In such a case, determination of the cancellation of the functional restriction made by risk determination unit 14 or 2114 conceptually includes easing of the function restriction.

(3) The representation of the place where the incident occurred in the incident information and the traveling position of the vehicle in the vehicle information are not restricted to the example using the place name such as the above-mentioned municipality. The representation may be such that the positional relationship between the place where the number of incidents is statistically large or small and the traveling position of the first vehicle can be understood. For example, a landmark or a facility name, such as a communication base station, a road name, and its section, latitude and longitude, or a grid map in which cells are arranged may be used to represent the traveling position. The positional relationship can be represented by, for example, the distance and direction, inclusion, or overlapping relative to the above. The latitude and longitude information is obtained, for example, as the latitude and longitude information provided from each vehicle. Other representations may be achieved, for example, by converting, in incident information collection server 30 or security risk countermeasure server 10, from the latitude and longitude information provided by each vehicle.

Then, risk determination unit 14 or 2114 redetermines the risk level of the vehicle function when the traveling position of the first vehicle has a predetermined change which can change the risk level. Examples of such a predetermined change include switching of the nearest facility, switching of a road or its section, a predetermined amount of change in longitude and latitude, and switching of a cell including the traveling position on a grid map.

(4) The order of execution of the steps for various processes (for example, the steps illustrated in FIG. 5, FIG. 8, FIG. 13 to FIG. 18C, FIG. 20, FIG. 22 to FIG. 25) shown in each of the above embodiments is not necessarily limited to the order described above. The execution order can be changed, a plurality of steps can be performed in parallel, or part of the steps can be omitted, without departing from the scope of the present disclosure.

(5) Part or all of the structural elements of each device in the above embodiments may be configured by a single system large scale integration (LSI). The system LSI is an ultra-multifunctional LSI manufactured by integrating a plurality of structural components on a single chip, and specifically, is a computer system including a microprocessor, a ROM, a RAM and the like. A computer program is recorded in the RAM. The system LSI achieves its function by the microprocessor operating according to the computer program. Moreover, each of the structural elements of each of the above-described devices may be individually made into a single chip, or may be made into a single chip so as to include part or all. Although the term "system LSI" is used here, it may be called IC, LSI, super LSI, or ultra LSI depending on the degree of integration. The method of circuit integration is not limited to LSI, and it may be realized by a dedicated circuit or a general-purpose processor. A field programmable gate array (FPGA) that can be programmed after the LSI is manufactured, or a reconfigurable processor that can reconfigure the connection and setting of circuit cells inside the LSI may be used. If an integrated circuit technology comes out to replace LSI as a result of the advancement of semiconductor technology or a derivative other technology, it is naturally also possible to carry out function block integration using such a technology.

(6) Part or all of the structural elements of each of the above devices may be configured with an integrated circuit (IC) card that can be attached to and detached from each device or a single module. The IC card or module is a computer system including a microprocessor, a ROM, a RAM and the like. The IC card or module may include the above-mentioned super-multifunctional LSI. The IC card or module achieves its function by the microprocessor operating according to the computer program. The IC card or module may be tamper resistant.

(7) As an aspect of the present disclosure, an information processing method may include, for example, all or part of the steps illustrated in FIG. 5, FIG. 8, FIG. 13 to FIG. 18C, FIG. 20, FIG. 22 to FIG. 25, and the like. Such a method may be realized by a program (computer program) implemented by a computer.

(8) One aspect of the present disclosure may be a computer-readable recording medium, such as a flexible disk, a hard disk, a CD-ROM, a MO, a DVD, a DVD-ROM, a DVD-RAM, a BD (Blu-ray (registered trademark) Disc), and a semiconductor memory, which can read the above computer program or a digital signal representing the computer program by a computer. Moreover, it may be a digital signal recorded on these recording media. As one aspect of the present disclosure, the above computer program or digital signal may be transmitted via an electronic communication line, a wireless or wired communication line, a network represented by the Internet, a data broadcast, or the like. One aspect of the present disclosure may be a computer system including a microprocessor and a memory in which the memory records the computer program and the microprocessor operates in accordance with the computer program. Alternatively, the program or the digital signal may be recorded on a recording medium and transferred, or the program or the digital signal may be transferred via a network or the like to be implemented by another independent computer system.

(9) A form realized by arbitrarily combining each structural element and function shown in the embodiments and modifications described above is also included in the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used in an information processing device, an information processing method, and a recording medium having a program recorded therein that process information used in a vehicle.

What is claimed is:
1. An information processing device that processes information about a first vehicle and information about a second vehicle, the information processing device comprising:
a processor; and
a memory including at least one set of instructions that, when executed by the processor, causes the processor to perform operations including:
obtaining incident information about an incident of a cyberattack that occurred in a vehicle;
obtaining second vehicle information about a state of the second vehicle via communication with the second vehicle;
storing, in the memory, the incident information and the second vehicle information;
determining a risk level of a vehicle function of the second vehicle based on a comparison between the incident information and the second vehicle information;
generating a function restriction command for restricting a vehicle function of the first vehicle corresponding to the vehicle function of the second vehicle, when the risk level is higher than a first criterion, the vehicle function of the first vehicle being one among one or more vehicle functions of the first vehicle; and
outputting the function restriction command,
wherein the operations further include:
generating a function restriction cancellation command for cancelling a restriction on the vehicle function of the first vehicle corresponding to the vehicle function of the second vehicle, when the risk level of the vehicle function of the second vehicle is lower than the first criterion, and
the outputting includes outputting the function restriction cancellation command,
wherein the determining of risk level includes redetermining the risk level of the vehicle function of the second vehicle, when a traveling state of the second vehicle indicated by the second vehicle information changes, and
wherein, when the traveling state of the second vehicle changes from a moving state to a stopped state, the generating of function restriction cancellation command includes generating the function restriction cancellation command for cancelling a restriction on a communication-related function among the one or more vehicle functions of the first vehicle.

2. The information processing device according to claim 1,
wherein the generating of function restriction command includes generating, as the function restriction command, a function invalidation command for invalidating the vehicle function of the first vehicle corresponding to the vehicle function of the second vehicle, when the risk level is higher than a second criterion that is higher than the first criterion.

3. The information processing device according to claim 1,
wherein, when the incident information stored in the memory includes incident information about an incident that occurred in the second vehicle, the determining of risk level includes determining the risk level of the vehicle function of the second vehicle to be higher than the first criterion.

4. The information processing device according to claim 1,
wherein, when the risk level of the vehicle function of the second vehicle is higher than a third criterion, and a distance between a traveling position of the first vehicle and a traveling position of the second vehicle is less than or equal to a predetermined distance, the generating of risk countermeasure command includes generating a function restriction command for restricting a traveling system function among the one or more vehicle functions of the first vehicle.

5. The information processing device according to claim 4, wherein, when the distance between the traveling position of the first vehicle and the traveling position of the second vehicle is greater than the predetermined distance, the generating of function restriction cancellation command includes generating the function restriction cancellation command for cancelling a restriction on the traveling system function of the first vehicle.

6. The information processing device according to claim 1, wherein the vehicle function of the first vehicle is a function related to traveling of the first vehicle, the function related to the traveling of the first vehicle is one of an automated driving function and a driving support function, and the function restriction command for restricting the vehicle function is a command for stopping the function related to the traveling of the first vehicle.

7. The information processing device according to claim 1, wherein the vehicle function of the first vehicle is a function related to traveling of the first vehicle, the function restriction command for restricting the vehicle function of the first vehicle is one of a command for setting an upper speed limit of the first vehicle to a predetermined speed and a command for setting a distance between the first vehicle and another vehicle to be greater than or equal to a predetermined distance.

8. The information processing device according to claim 1, wherein the vehicle function of the first vehicle is a function related to communication involving the first vehicle, and the function related to the communication involving the first vehicle is at least one of communication between devices of the first vehicle, communication between the first vehicle and a device of an occupant of the first vehicle, or communication between the first vehicle and a device external to the first vehicle.

9. The information processing device according to claim 1, wherein the vehicle function of the first vehicle is a communication function of the first vehicle, and the function restriction command for restricting the vehicle function of the first vehicle is one of a command for stopping the communication function of the first vehicle and a command for restricting a communication bandwidth of the communication function of the first vehicle to a predetermined bandwidth.

10. An information processing method performed by a processor included in an information processing device that processes information about a first vehicle and information about a second vehicle, the information processing method comprising:
obtaining incident information about an incident of a cyberattack that occurred in a vehicle;
obtaining second vehicle information about a state of the second vehicle via communication with the second vehicle;
determining a risk level of a vehicle function of the second vehicle based a comparison between the incident information and the second vehicle information; and
generating and outputting a function restriction command for restricting a vehicle function of the first vehicle corresponding to the vehicle function of the second vehicle, when the risk level is higher than a first criterion,
wherein the information processing method further includes:
generating a function restriction cancellation command for cancelling a restriction on the vehicle function of the first vehicle corresponding to the vehicle function of the second vehicle, when the risk level of the vehicle function of the second vehicle is lower than the first criterion, and
the outputting includes outputting the function restriction cancellation command,
wherein the determining of risk level includes redetermining the risk level of the vehicle function of the second vehicle, when a traveling state of the second vehicle indicated by the second vehicle information changes, and
wherein, when the traveling state of the second vehicle changes from a moving state to a stopped state, the generating of function restriction cancellation command includes generating the function restriction cancellation command for cancelling a restriction on a communication-related function among the one or more vehicle functions of the first vehicle.

11. A non-transitory computer-readable recording medium having a program for use in an information processing device that includes a processor and a memory, the information processing device processing information about a first vehicle and information about a second vehicle, the program, when executed by the processor using the memory, causing the processor to execute steps comprising:
obtaining incident information about an incident of a cyberattack that occurred in a vehicle;
obtaining second vehicle information about a state of the second vehicle via communication with the second vehicle;
determining a risk level of a vehicle function of the second vehicle based on a comparison between the incident information and the second vehicle information; and
generating and outputting a function restriction command for restricting a vehicle function of the first vehicle corresponding to the vehicle function of the second vehicle, when the risk level is higher than a first criterion,
wherein the steps executed by the processor further includes:
generating a function restriction cancellation command for cancelling a restriction on the vehicle function of the first vehicle corresponding to the vehicle function of the second vehicle, when the risk level of the vehicle function of the second vehicle is lower than the first criterion, and
the outputting includes outputting the function restriction cancellation command,
wherein the determining of risk level includes redetermining the risk level of the vehicle function of the second vehicle, when a traveling state of the second vehicle indicated by the second vehicle information changes, and
wherein, when the traveling state of the second vehicle changes from a moving state to a stopped state, the generating of function restriction cancellation command includes generating the function restriction cancellation command for cancelling a restriction on a communication-related function among the one or more vehicle functions of the first vehicle.

\* \* \* \* \*